(12) United States Patent
Yoo et al.

(10) Patent No.: US 12,025,778 B2
(45) Date of Patent: Jul. 2, 2024

(54) OPTICAL IMAGING SYSTEM

(71) Applicant: Samsung Electro-Mechanics Co., Ltd., Suwon-si (KR)

(72) Inventors: Ho Sik Yoo, Suwon-si (KR); Dong Shin Yang, Suwon-si (KR); Yong Joo Jo, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 31 days.

(21) Appl. No.: 17/723,898

(22) Filed: Apr. 19, 2022

(65) Prior Publication Data

US 2022/0252845 A1 Aug. 11, 2022

Related U.S. Application Data

(63) Continuation of application No. 16/574,364, filed on Sep. 18, 2019, now Pat. No. 11,340,431, which is a continuation of application No. 15/880,856, filed on Jan. 26, 2018, now Pat. No. 10,459,203.

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .. G02B 13/0045; G02B 9/64; G02B 13/0015; G02B 13/18
USPC .................................. 359/642, 708
See application file for complete search history.

(56) References Cited

U.S. PATENT DOCUMENTS

| | | | |
|---|---|---|---|
| 9,904,014 B1 | 2/2018 | Chang et al. | |
| 2006/0209426 A1 | 9/2006 | Suzuki | |
| 2014/0009843 A1* | 1/2014 | Tsai | H04N 23/55 359/708 |
| 2014/0160580 A1 | 6/2014 | Nishihata et al. | |
| 2015/0009578 A1 | 1/2015 | Shinohara et al. | |

(Continued)

FOREIGN PATENT DOCUMENTS

| | | |
|---|---|---|
| CN | 104597582 A | 5/2015 |
| CN | 105301746 A | 2/2016 |

(Continued)

OTHER PUBLICATIONS

Korean Office Action dated Jun. 21, 2018 in corresponding Korean Patent Application No. 10-2017-0104577 (10 pages in English and 6 pages in Korean).

(Continued)

*Primary Examiner* — Tuyen Tra
(74) *Attorney, Agent, or Firm* — NSIP Law

(57) ABSTRACT

An optical imaging system includes: a first lens having a concave image-side surface; a second lens having refractive power; a third lens having a concave image-side surface; a fourth lens having a concave object-side surface or a convex image-side surface; a fifth lens having refractive power; a sixth lens having a concave image-side surface; and a seventh lens having negative refractive power. The first to seventh lenses are sequentially disposed from an object side and $1.62<(N2+N5+N6)/3$, where N2 is a refractive index of the second lens, N5 is a refractive index of the fifth lens, and N6 is a refractive index of the sixth lens.

15 Claims, 15 Drawing Sheets

(56) References Cited

U.S. PATENT DOCUMENTS

| | | |
|---|---|---|
| 2015/0198791 A1* | 7/2015 | Kubota .............. G02B 27/0025 |
| | | 359/689 |
| 2015/0212298 A1 | 7/2015 | Shinohara et al. |
| 2015/0378131 A1 | 12/2015 | Tang et al. |
| 2016/0033742 A1 | 2/2016 | Huang |
| 2016/0241756 A1 | 8/2016 | Chen |
| 2017/0082834 A1* | 3/2017 | Tang ................. G02B 13/0045 |
| 2017/0219798 A1 | 8/2017 | Park |
| 2017/0307858 A1 | 10/2017 | Chen |
| 2018/0188483 A1 | 7/2018 | Hsieh et al. |
| 2018/0188485 A1 | 7/2018 | Fan et al. |
| 2018/0196239 A1 | 7/2018 | Chang et al. |
| 2019/0041611 A1 | 2/2019 | Chang et al. |

FOREIGN PATENT DOCUMENTS

| | | |
|---|---|---|
| CN | 106896476 A | 6/2017 |
| CN | 106896477 A | 6/2017 |
| CN | 106896478 A | 6/2017 |
| CN | 107015343 A | 8/2017 |
| CN | 107037568 A | 8/2017 |
| JP | 2003-5070 A | 1/2003 |
| JP | 2006-243631 A | 9/2006 |
| JP | 2015-72404 A | 4/2015 |
| JP | 2015-141267 A | 8/2015 |
| TW | I534467 B | 5/2016 |

OTHER PUBLICATIONS

Chinese Office Action dated Jul. 1, 2020 in counterpart Chinese Patent Application No. 201810343894.2 (4 pages in English and 6 pages in Chinese).

Korean Office Action dated Feb. 10, 2021 in counterpart Korean Patent Application No. 10-2021-0006737 (6 pages in English and 4 pages in Korean).

Notice of Reason for Rejection dated Oct. 27, 2021, in counterpart Korean Patent Application No. 10-2021-0135203 (5 pages in English and 4 pages in Korean).

Korean Office Action dated Aug. 4, 2022, in counterpart Korean Patent Application No. 10-2022-0088375 (5 pages in English and 4 pages in Korean).

Chinese Office Action dated May 27, 2022, in counterpart Chinese Patent Application No. 202111045336.6 (8 pages in English and 10 pages in Chinese).

Korean Office Action dated Sep. 18, 2023, in counterpart Korean Patent Application No. 10-2023-0044218 (8 pages in English, 5 pages in Korean).

* cited by examiner

OPTICAL IMAGING SYSTEM

CROSS-REFERENCE TO RELATED APPLICATIONS

This application is a Continuation application of U.S. patent application Ser. No. 16/574,364 filed on Sep. 18, 2019, now U.S. Pat. No. 11,340,431 issued on May 24, 2022, which is a Continuation application of U.S. patent application Ser. No. 15/880,856 filed on Jan. 26, 2018, now U.S. Pat. No. 10,459,203 issued Oct. 29, 2019, which claims the benefit under 35 USC 119(a) of Korean Patent Application No. 10-2017-0104577 filed on Aug. 18, 2017, in the Korean Intellectual Property Office, the entire disclosures of which are incorporated herein by reference for all purposes.

BACKGROUND

1. Field

This application relates to an optical imaging system including seven lenses.

2. Description of the Background

Small camera modules are commonly mounted in wireless terminals. For example, small camera modules may be mounted on a front surface and a rear surface of a wireless terminal, respectively. Since such small camera modules are used for a variety of applications such as the capturing of outdoor landscape images, the capturing of indoor person images, and the like, they are required to have a degree of performance that is not inferior to that of general cameras. However, such small camera modules have a limitation in terms of mounting space, due to the size of wireless terminals, and it may thus be difficult to realize a small camera module having high performance. Therefore, it is necessary to develop an optical imaging system capable of improving performance of a small camera module without increasing a size of the small camera module.

For reference, U.S. Patent Application Publication No. 2014-0160580(A), Japan Patent Unexamined Publication No. JP2015-72404 A, and U.S. Patent Application Publication No. 2016-0033742(A), the entire contents of which are incorporated herein by reference for all purposes, disclose optical imaging systems.

The above information disclosed in this Background section is only for enhancement of understanding of the background of the disclosure and therefore it may contain information that does not form any part of the prior art nor what the prior art may suggest to a person of ordinary skill in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a concave image-side surface, a second lens having refractive power, a third lens having a concave image-side surface, a fourth lens having a convex object-side surface or a convex image-side surface, a fifth lens having refractive power, a sixth lens having a concave image-side surface, and a seventh lens having negative refractive power. The first to seventh lenses are sequentially disposed from an object side and $1.62<(N2+N5+N6)/3$, where N2 is a refractive index of the second lens, N5 is a refractive index of the fifth lens, and N6 is a refractive index of the sixth lens.

The first lens may have positive refractive power. The second lens may have negative refractive power. The third lens may have positive refractive power.

An object-side surface of the fifth lens may be concave. An image-side surface of the seventh lens may include an inflection point.

An f-number of the optical imaging system may be 1.8 or less.

A ratio $f123/f$ may be greater than 0.75 and less than 1.3, where f is an overall focal length of the optical imaging system, and f123 is a synthetic focal length of the first, second, and third lenses.

A ratio $f4567/f$ may be greater than $-8.0$ and less than $-1.5$, where f is an overall focal length of the optical imaging system, and f4567 is a synthetic focal length of the fourth, fifth, sixth, and seventh lenses.

A ratio $ct1/ct2$ may be greater than 2.8, where ct1 is a thickness of the first lens in an optical axis portion, and ct2 is a thickness of the second lens in an optical axis portion.

A difference $v1-v2$ may be greater than 28 and less than 42, where v1 is an Abbe number of the first lens and v2 is an Abbe number of the second lens.

In another general aspect, an optical imaging system includes a first lens having a concave image-side surface, a second lens having refractive power, a third lens having a concave image-side surface, a fourth lens having refractive power, a fifth lens having refractive power, a sixth lens having a concave image-side surface, and a seventh lens having negative refractive power, and an inflection point formed on an image-side surface thereof. The first to seventh lenses are sequentially disposed from an object side. f-number of the optical imaging system is less than 1.8 and $f1/f2$ is greater than $-0.75$ and less than $-0.3$, where a f1 is a focal length of the first lens, and f2 is a focal length of the second lens.

The second lens may have negative refractive power. The third lens may have positive refractive power.

An object-side surface or an image-side surface of the fourth lens may be concave.

A synthetic focal distance of the fourth, fifth, and sixth lenses may have a negative value.

In another general aspect, an optical imaging system includes a first lens having a concave image-side surface, a second lens having refractive power, a third lens having a concave image-side surface, a fourth lens having refractive power, a fifth lens having refractive power, a sixth lens having a concave image-side surface, and a seventh lens having negative refractive power. The first to seventh lenses are sequentially disposed from an object side. Any one or any combination of any two or more of the following expressions are satisfied: $-8.0<f4567/f<-1.5$, $0.65<ImgH/f$, and $ctmin<0.3$, where f is an overall focal length of the optical imaging system, f4567 is a synthetic focal length of the fourth, fifth, sixth, and seventh lenses, ImgH is one-half (½) of a diagonal length of an imaging plane, and ctmin is a thickness value of a lens having the smallest thickness in the optical axis portion among the first to seventh lenses.

An image-side surface of the fourth lens may be convex. An object-side surface of the fourth lens may be concave. An object-side surface of the fifth lens may be concave.

Other features and aspects will be apparent from the following detailed description, the drawings, and the claims.

DETAILED DESCRIPTION

Figure 1:
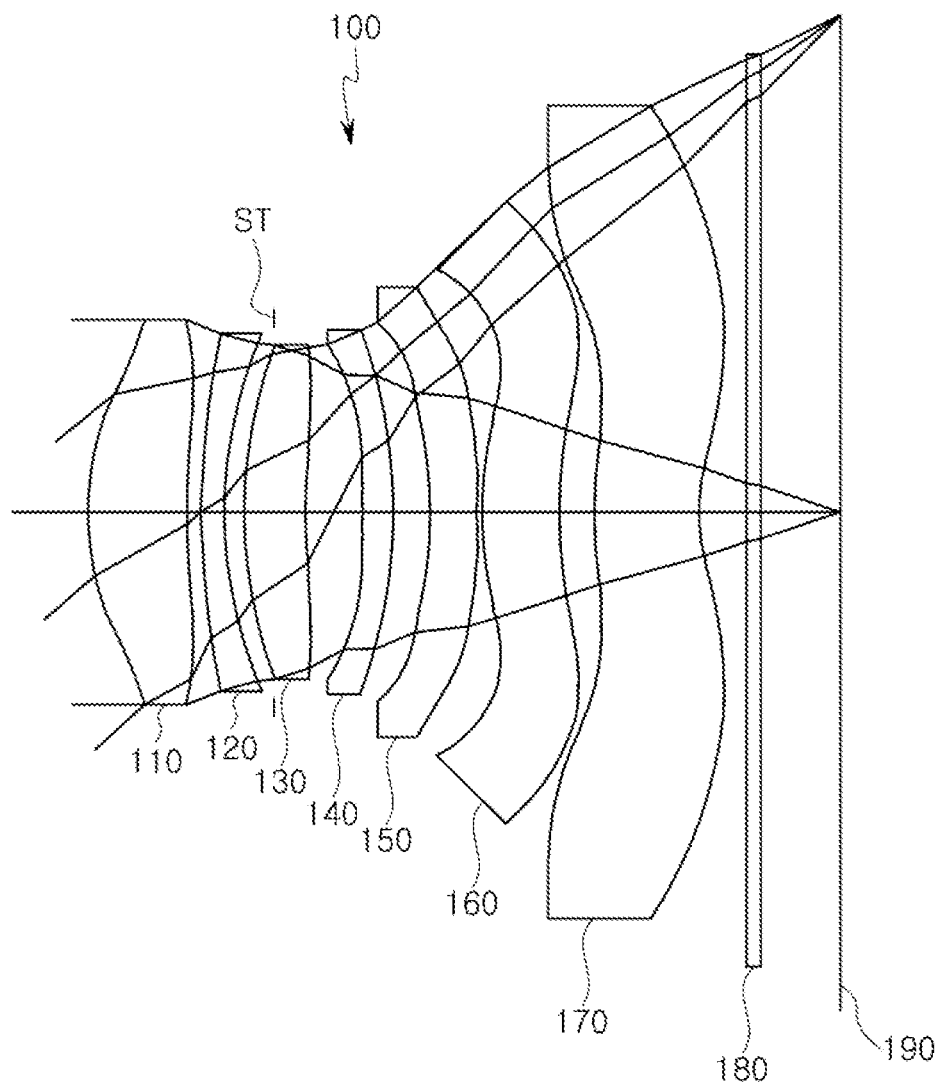
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

An aspect of the present disclosure may provide an optical imaging system capable of improving performance of a small camera module.

In this application, a first lens is a lens closest to an object (or a subject), while a seventh lens is a lens closest to an imaging plane (or an image sensor). Further, in this application, all radii of curvature and thicknesses of lenses, distances from object-side surfaces of first lenses to imaging planes (TLs), one-half (½) diagonal lengths of the imaging planes (ImgHs), and focal lengths are represented in millimeters (mm).

Further, thicknesses of the lenses, gaps between the lenses, and TLs are distances measured based on optical axes of the lenses. Further, in descriptions of shapes of the lenses, a statement that one surface of a lens is convex means that a paraxial region of a corresponding surface is convex, and a statement that one surface of a lens is concave means that a paraxial region of a corresponding surface is concave. Therefore, even when one surface of a lens is described as being convex, an edge portion of the lens may be concave. Likewise, even when one surface of a lens is described as being concave, an edge portion of the lens may be convex.

An optical imaging system includes seven lenses. For example, the optical imaging system includes a first lens, a second lens, a third lens, a fourth lens, a fifth lens, a sixth lens, and a seventh lens that are sequentially disposed from an object side.

The first lens has refractive power. For example, the first lens has positive refractive power. One surface of the first lens may be convex. For example, an object-side surface of the first lens is convex.

The first lens may have an aspherical surface. For example, both surfaces of the first lens are aspherical. The first lens may be formed of a material having high light transmissivity and excellent workability. For example, the first lens is formed of plastic. The first lens may have a low refractive index. For example, the refractive index of the first lens is less than 1.6.

The second lens may have refractive power. For example, the second lens has negative refractive power. One surface of the second lens may be convex. For example, an object-side surface of the second lens is convex.

The second lens may have an aspherical surface. For example, an object-side surface of the second lens is aspherical. The second lens may be formed of a material having high light transmissivity and excellent workability. For example, the second lens is formed of plastic. The second lens may have a refractive index greater than that of the first lens. For example, the refractive index of the second lens is 1.65 or more.

The third lens may have refractive power. For example, the third lens has positive refractive power. One surface of the third lens may be convex. For example, an object-side surface of the third lens is convex.

The third lens may have an aspherical surface. For example, an image-side surface of the third lens is aspherical. The third lens may be formed of a material having high light transmissivity and excellent workability. For example, the third lens is formed of plastic. The third lens may have a refractive index substantially similar to that of the first lens. For example, the refractive index of the third lens is less than 1.6.

The fourth lens may have refractive power. For example, the fourth lens has positive or negative refractive power. One surface of the fourth lens may be concave, and the other surface thereof may be convex. For example, an object-side surface of the fourth lens is concave and an image-side surface thereof is convex, or an object-side surface of the fourth lens is convex and an image-side surface thereof is concave.

The fourth lens may have an aspherical surface. For example, both surfaces of the fourth lens are aspherical. The fourth lens may be formed of a material having high light transmissivity and excellent workability. For example, the fourth lens is formed of plastic. The fourth lens may have a refractive index that is substantially the same as that of the first lens. For example, the refractive index of the fourth lens is less than 1.6.

The fifth lens may have refractive power. For example, the fifth lens has positive or negative refractive power.

The fifth lens may have an aspherical surface. For example, both surfaces of the fifth lens are aspherical. The fifth lens may be formed of a material having high light transmissivity and excellent workability. For example, the fifth lens is formed of plastic. The fifth lens may have a refractive index greater than that of the fourth lens. For example, the refractive index of the fifth lens is 1.6 or more.

The sixth lens may have refractive power. For example, the sixth lens has positive or negative refractive power. One surface of the sixth lens may be concave. For example, an image-side surface of the sixth lens is concave. The sixth lens may have inflection points. For example, one or more inflection points are formed on both surfaces of the sixth lens.

The sixth lens may have an aspherical surface. For example, both surfaces of the sixth lens are aspherical. The sixth lens may be formed of a material having high light transmissivity and excellent workability. For example, the sixth lens is formed of plastic. The sixth lens may have a refractive index that is substantially similar to that of the fifth lens. For example, the refractive index of the sixth lens is 1.6 or more.

The seventh lens may have refractive power. For example, the seventh lens has negative refractive power. One surface of the seventh lens may be convex. For example, an object-side surface of the seventh lens is convex. The seventh lens may have inflection points. For example, one or more inflection points are formed on both surfaces of the seventh lens.

The seventh lens may have an aspherical surface. For example, both surfaces of the seventh lens are aspherical. The seventh lens may be formed of a material having high light transmissivity and excellent workability. For example, the seventh lens is formed of plastic. The seventh lens may have a refractive index less than that of the sixth lens. For example, a refractive index of the seventh lens is less than 1.6.

Any of the aspherical surfaces of the first to seventh lenses may be represented by Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

A lens group consisting of the first, second, and third lenses in the optical imaging system may have positive refractive power. For example, a synthetic focal length (effective focal length or composite focal length) of the lens group of the first, second, and third lenses has a positive value. A lens group consisting of the fourth, fifth, sixth, and seventh lenses in the optical imaging system may have negative refractive power. For example, a synthetic focal length of the lens group of the fourth, fifth, sixth, and seventh lenses has a negative value.

The optical imaging system may further include a filter, an image sensor, and a stop.

The filter may be disposed between the seventh lens and the image sensor. The filter blocks a partial wavelength of light so that a clear image may be realized. For example, the filter blocks an infrared wavelength of light.

The image sensor forms an imaging plane. For example, a surface of the image sensor forms the imaging plane.

The stop is disposed to control an amount of light incident to the lenses. For example, the stop is disposed between the second lens and third lens or between the third lens and the fourth lens.

The optical imaging system may satisfy the following Conditional Expressions:

$0.8 < TL/f < 1.4$ $1.2 < TL/ImgH < 2.0$ $0.8 < Td/f < 1.2$ $0.65 < f1/f < 1.5$ $1.2 < f3/f < 8.0$ $0.75 < f123/f < 1.3$ $-8.0 < f4567/f < -1.5$ $-0.75 < f1/f2 < -0.3$ $0.35 < r4/f < 0.95$ $0.6 < r12/f < 1.7$ $0.15 < (r3-r4)/(r3+r4) < 0.5$ $1.1 < |f/f1| + |f/f2| < 2.1$ $\Sigma cti < 3.8 \ (i=1,2,3 \ldots 7)$ $0.65 < ImgH/f$ $2.8 < ct1/ct2$ $28 < v1-v2 < 42$ $1.6 < N\text{max}$ $ct\text{min} < 0.3$ $1.62 < (N2+N5+N6)/3.$ In the above Conditional Expressions, TL is a distance from the object-side surface of the first lens to the imaging plane, f is an overall focal length of the optical imaging system, ImgH is one-half (½) of a diagonal length of the imaging plane, Td is the sum of thicknesses of the first to seventh lenses, f1 is a focal length of the first lens, f2 is a focal length of the second lens, f3 is a focal length of the third lens, f123 is a synthetic focal length of the first, second, and third lenses, f4567 is a synthetic focal length of the fourth, fifth, sixth, and seventh lenses, r3 is a radius of curvature of the object-side surface of the second lens, r4 is a radius of curvature of an image-side surface of the second lens, r12 is a radius of curvature of the image-side surface of the sixth lens, ct1 is a thickness of the first lens in an optical axis portion, ct2 is a thickness of the second lens in an optical axis portion, ct3 is a thickness of the third lens in an optical axis portion, ct4 is a thickness of the fourth lens in an optical axis portion, ct5 is a thickness of the fifth lens in an optical axis portion, ct6 is a thickness of the sixth lens in an optical axis portion, ct7 is a thickness of the seventh lens in an optical axis portion, v1 is an Abbe number of the first lens, v2 is an Abbe number of the second lens, Nmax is a refractive index value of a lens having the greatest refractive index among the first to seventh lenses, ctmin is a thickness value of a lens having the smallest thickness in the optical axis portion among the first to seventh lenses, N2 is a refractive index of the second lens, N5 is a refractive index of the fifth lens, and N6 is a refractive index of the sixth lens.

Next, optical imaging systems according to several examples will be described.

First, an optical imaging system according to a first example will be described with reference to FIG. 1.

The optical imaging system 100 according to the first example includes a first lens 110, a second lens 120, a third lens 130, a fourth lens 140, a fifth lens 150, a sixth lens 160, and a seventh lens 170.

The first lens 110 has positive refractive power, and an object-side surface thereof is convex and an image-side surface thereof is concave. The second lens 120 has negative refractive power, and an object-side surface thereof is convex and an image-side surface thereof is concave. The third lens 130 has positive refractive power, and an object-side surface thereof is convex and an image-side surface thereof is concave. The fourth lens 140 has positive refractive power, and an object-side surface thereof is concave and an image-side surface thereof is convex. The fifth lens 150 has negative refractive power, and an object-side surface thereof is concave and an image-side surface thereof is concave. The sixth lens 160 has positive refractive power, and an object-side surface thereof is convex and an image-side surface thereof is concave. In addition, an inflection point is formed on at least one of the object-side surface and the image-side surface of the sixth lens 160. The seventh lens 170 has negative refractive power, and an object-side surface thereof is convex and an image-side surface thereof is concave. In addition, an inflection point is formed on at least one of the object-side surface and the image-side surface of the seventh lens 170.

The optical imaging system 100 further includes a filter 180, an image sensor 190, and a stop ST. The filter 180 is disposed between the seventh lens 170 and the image sensor 190, and the stop ST is disposed between the second lens 120 and the third lens 130.

The optical imaging system 100 may include a plurality of lenses having a high refractive index. For example, the second lens 120, the fifth lens 150, and the sixth lens 160 have a refractive index of 1.6 or more. For example, the second lens 120, the fifth lens 150, and the sixth lens 160 have a refractive index that is greater than 1.65 and less than 2.0.

The optical imaging system 100 may be configured to realize a light optical system. For example, an f-number of the optical imaging system 100 is 1.582. The optical imaging system 100 may have a wide field of view (Fov). For example, an entire field of view of the optical imaging system 100 is 78.43°.

In the optical imaging system according the first example, a synthetic focal length f123 of the first to third lenses is 4.469 mm, and a synthetic focal length f4567 of the fourth to seventh lenses is −12.1516 mm.

Figure 2:
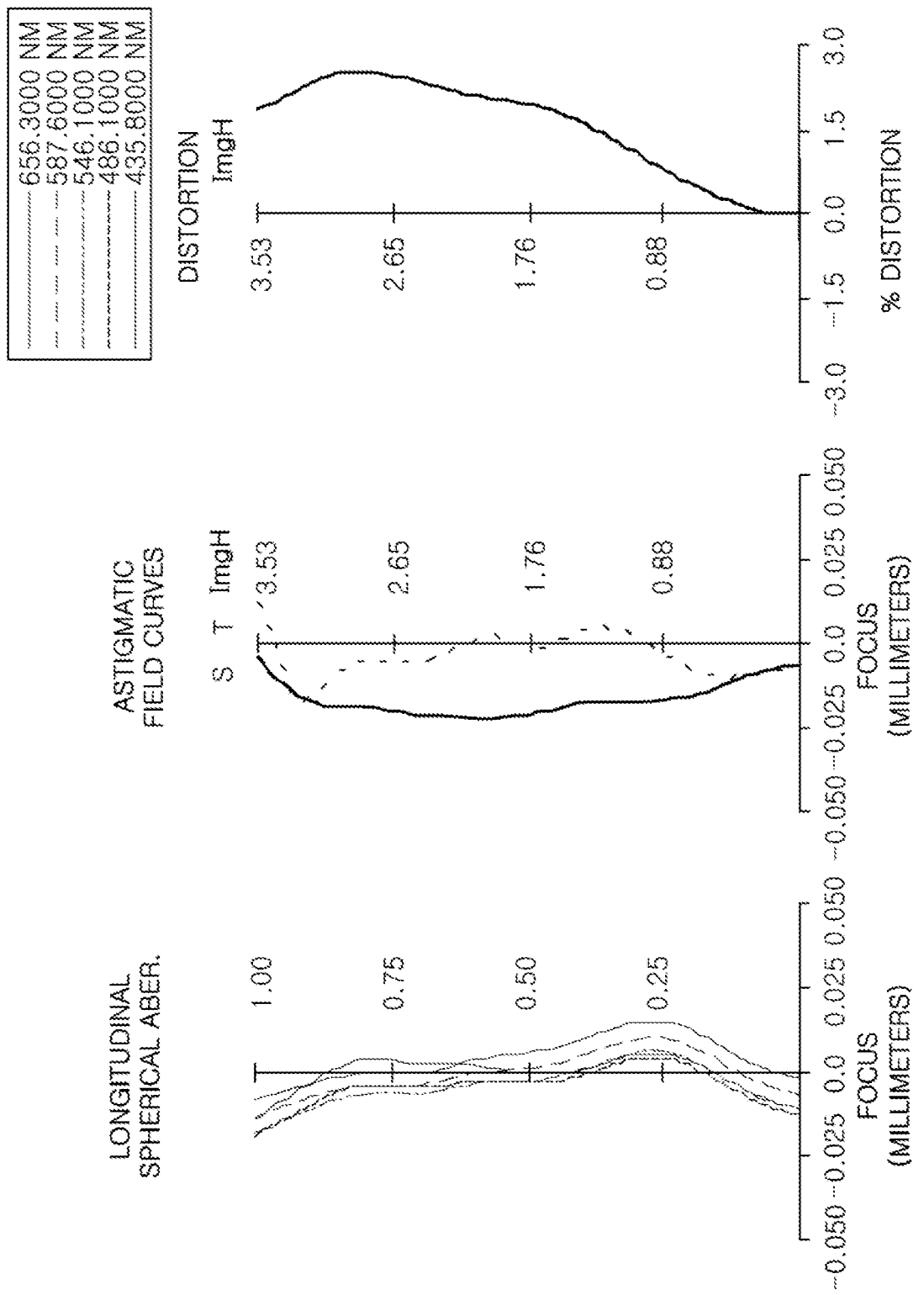
FIGS. 2 and 3 illustrate examples of curves representing aberration characteristics of the optical imaging system illustrated in FIG. 1.
Figure 3:
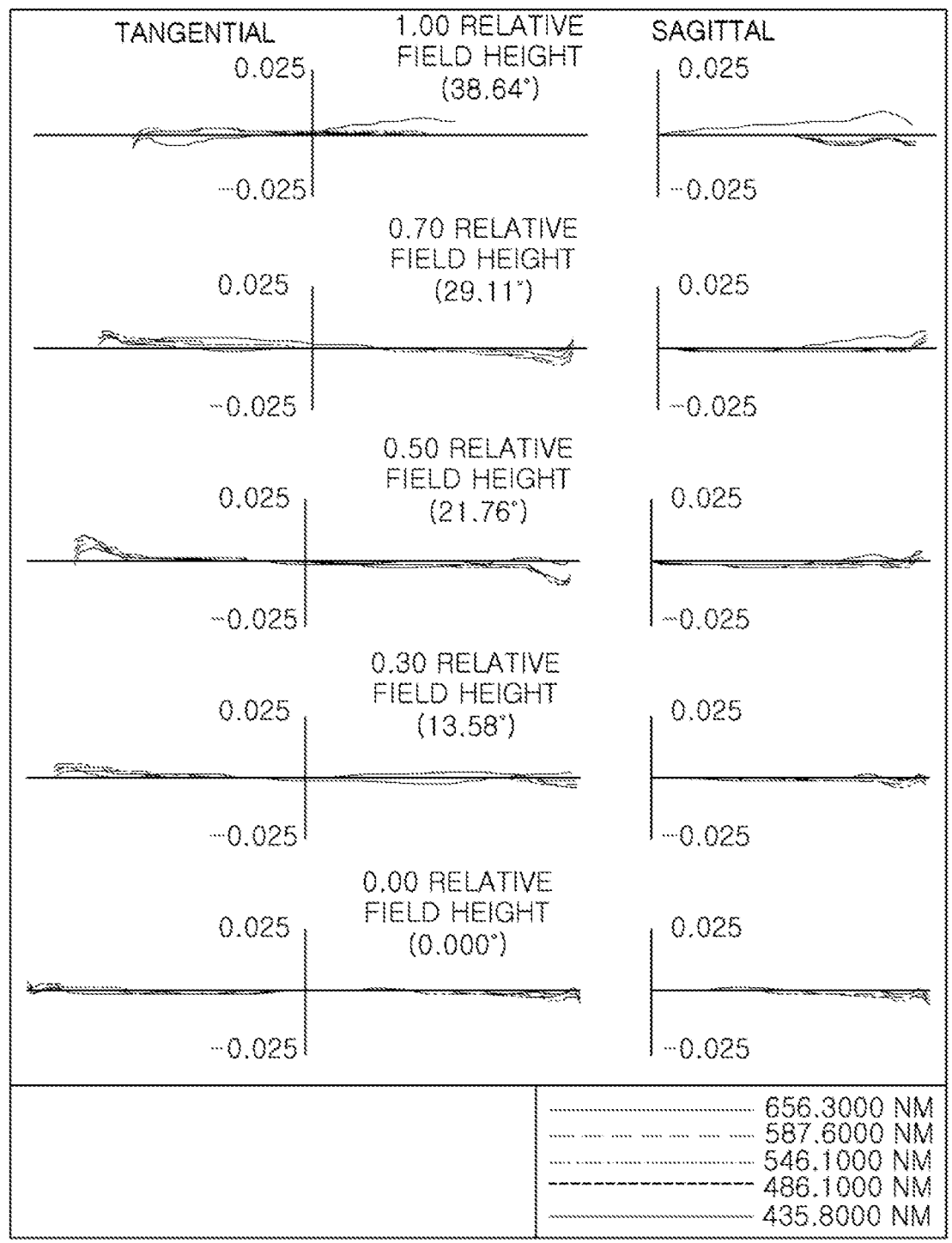

The optical imaging system configured as described above may represent aberration characteristics as illustrated in FIGS. 2 and 3. Table 1 represents characteristics of lenses of the optical imaging system according to the first example, and Table 2 represents aspherical values of the optical imaging system according to the first example.

TABLE 1

First Example

| | f = 4.324 | | f-number = 1.582 | | Fov = 78.427 | | TL = 5.333 |
|---|---|---|---|---|---|---|---|
| Surface No. | | Radius of Curvature | Thickness/ Distance | Effective Radius | Refractive Index | Abbe Number | Focal Length |
| S1 | First | 2.0001 | 0.7050 | 1.367 | 1.544 | 56.11 | 5.343 |
| S2 | Lens | 5.6139 | 0.1043 | 1.341 | | | |
| S3 | Second | 3.5798 | 0.1600 | 1.271 | 1.661 | 20.35 | −9.402 |
| S4 | Lens | 2.2313 | 0.1365 | 1.202 | | | |
| S5 | Third | 2.6114 | 0.4400 | 1.182 | 1.544 | 56.11 | 6.715 |
| S6 | Lens | 8.6117 | 0.3985 | 1.186 | | | |
| S7 | Fourth | −11.9886 | 0.2200 | 1.197 | 1.544 | 56.11 | 27.736 |
| S8 | Lens | −6.7243 | 0.2600 | 1.283 | | | |
| S9 | Fifth | −3.3038 | 0.3500 | 1.365 | 1.661 | 20.35 | −4.899 |
| S10 | Lens | 173.4015 | 0.0300 | 1.623 | | | |
| S11 | Sixth | 2.0268 | 0.5400 | 1.738 | 1.661 | 20.35 | 7.165 |
| S12 | Lens | 3.1666 | 0.2620 | 2.243 | | | |
| S13 | Seventh | 2.2206 | 0.7422 | 2.522 | 1.544 | 56.11 | −23.507 |
| S14 | Lens | 1.6692 | 0.6315 | 2.972 | | | |
| S15 | Filter | infinity | 0.1100 | | 1.517 | 64.20 | |
| S16 | | infinity | 0.2435 | | | | |
| S17 | Imaging Plane | infinity | | | | | |

TABLE 2

| Surface | Radius of Curvature | K | A | B | C | D |
|---|---|---|---|---|---|---|
| S1 | 2.0001 | −1.231672E−01 | −1.043782E−02 | 1.454843E−02 | −4.494287E−02 | 4.772592E−02 |
| S2 | 5.6139 | −3.173960E+01 | −1.506912E−02 | 7.809646E−03 | −1.042633E−01 | 1.485996E−01 |
| S3 | 3.5798 | −1.716735E+01 | −7.516615E−02 | 1.824547E−01 | −4.467193E−01 | 6.245437E−01 |

TABLE 2-continued

| | | | | | | |
|---|---|---|---|---|---|---|
| S4 | 2.2313 | −4.667281E+00 | −1.008802E−01 | 2.597958E−01 | −5.472707E−01 | 7.776596E−01 |
| S5 | 2.6114 | 1.100744E+00 | −8.314364E−02 | 1.105371E−01 | −2.671414E−01 | 4.478780E−01 |
| S6 | 8.6117 | −5.233252E+01 | −1.726335E−02 | −2.026445E−02 | 3.204298E−02 | −7.866939E−02 |
| S7 | −11.9886 | 8.894623E+01 | −9.480821E−02 | 7.755493E−02 | −1.297176E−01 | 2.115491E−02 |
| S8 | −6.7243 | 2.311317E+01 | −1.127543E−01 | 2.534261E−01 | −4.404771E−01 | 5.014547E−01 |
| S9 | −3.3038 | −7.085514E+00 | −8.462840E−02 | 2.706194E−01 | −3.883292E−01 | 3.151669E−01 |
| S10 | 173.4015 | 0.000000E+00 | −3.017455E−01 | 5.029504E−01 | −6.020604E−01 | 4.810302E−01 |
| S11 | 2.0268 | −9.867405E+00 | −8.419646E−02 | 1.265684E−01 | −1.708888E−01 | 1.068173E−01 |
| S12 | 3.1666 | −1.061683E+01 | −1.073654E−01 | 2.041566E−02 | −4.562344E−02 | 3.094665E−02 |
| S13 | 2.2206 | −4.292304E−01 | −3.142721E−01 | 1.787860E−01 | −8.259206E−02 | 2.818674E−02 |
| S14 | 1.6692 | −7.934549E−01 | −2.214913E−01 | 1.059749E−01 | −4.191293E−02 | 1.119773E−02 |

| Surface | E | F | G | H |
|---|---|---|---|---|
| S1 | −2.993043E−02 | 7.870130E−03 | −1.321696E−04 | −0.000190762 |
| S2 | −1.039013E−01 | 4.134505E−02 | −9.179936E−03 | 0.000896087 |
| S3 | −5.041557E−01 | 2.490018E−01 | −7.158608E−02 | 0.009121201 |
| S4 | −7.131521E−01 | 4.243436E−01 | −1.474167E−01 | 0.021898576 |
| S5 | −5.195353E−01 | 3.842711E−01 | −1.518532E−01 | 0.024321547 |
| S6 | 9.392720E−02 | −6.222050E−02 | 2.696224E−02 | −0.005216322 |
| S7 | 9.799022E−02 | −9.109947E−02 | 4.206995E−02 | −0.009303427 |
| S8 | −4.656573E−01 | 3.332648E−01 | −1.391162E−01 | 0.024306268 |
| S9 | −1.855522E−01 | 7.823532E−02 | −2.036898E−02 | 0.002339832 |
| S10 | −2.579051E−01 | 8.706344E−02 | −1.625206E−02 | 0.001251491 |
| S11 | −3.448127E−02 | 3.473622E−03 | 7.623498E−04 | −0.000151610 |
| S12 | −1.146995E−02 | 2.460459E−03 | −2.829771E−04 | 0.000013406 |
| S13 | −6.286960E−03 | 8.512923E−04 | −6.356961E−05 | 0.000002010 |
| S14 | −1.882349E−03 | 1.899364E−04 | −1.051123E−05 | 0.000000245 |

Figure 4:
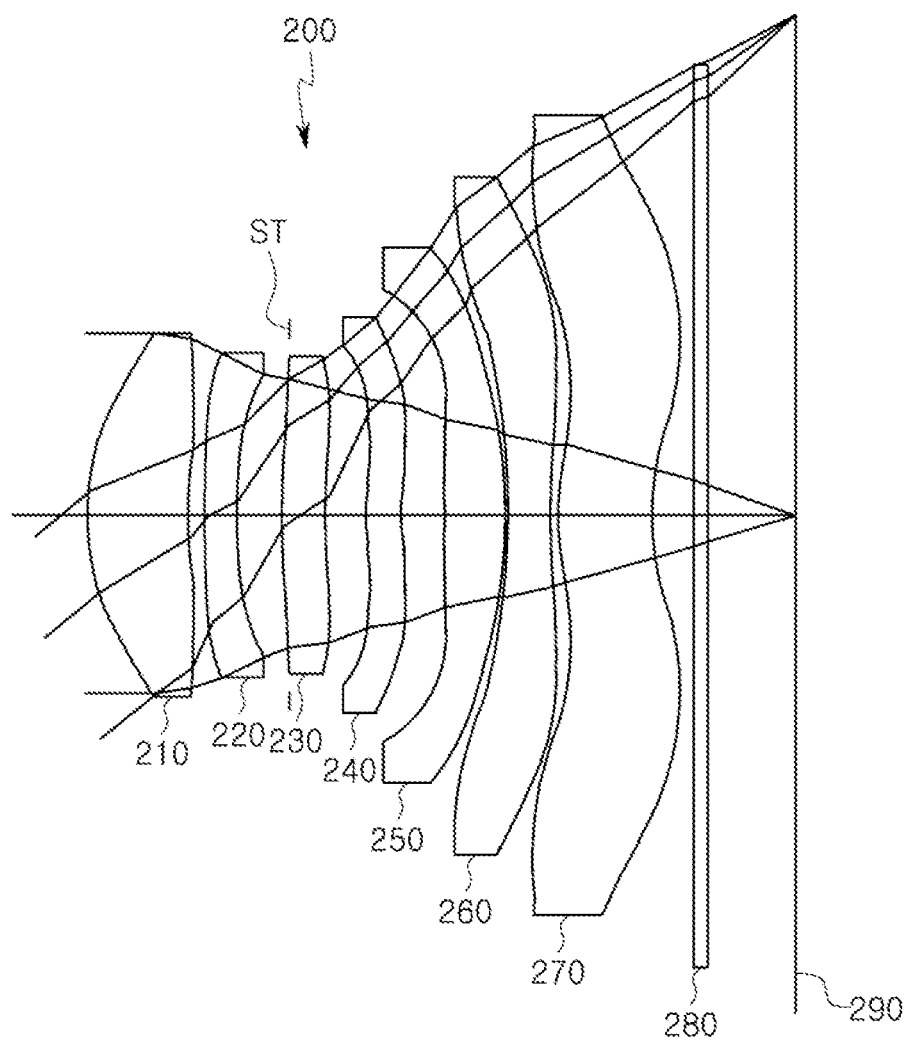
FIG. 4 is a view illustrating a second example of an optical imaging system.

An optical imaging system according to a second example will be described with reference to FIG. 4.

The optical imaging system 200 according to the second example includes a first lens 210, a second lens 220, a third lens 230, a fourth lens 240, a fifth lens 250, a sixth lens 260, and a seventh lens 270.

The first lens 210 has positive refractive power, and an object-side surface thereof is convex and an image-side surface thereof is concave. The second lens 220 has negative refractive power, and an object-side surface thereof is convex and an image-side surface thereof is concave. The third lens 230 has positive refractive power, and an object-side surface thereof is convex and an image-side surface thereof is concave. The fourth lens 240 has negative refractive power, and an object-side surface thereof is convex and an image-side surface thereof is concave. The fifth lens 250 has positive refractive power, and an object-side surface thereof is concave and an image-side surface thereof is convex. The sixth lens 260 has negative refractive power, and an object-side surface thereof is concave and an image-side surface thereof is concave. In addition, an inflection point is formed on at least one of the object-side surface and the image-side surface of the sixth lens 260. The seventh lens 270 has negative refractive power, and an object-side surface thereof is convex and an image-side surface thereof is concave. In addition, an inflection point is formed on at least one of the object-side surface and the image-side surface of the seventh lens 270.

The optical imaging system 200 further includes a filter 280, an image sensor 290, and a stop ST. The filter 280 is disposed between the seventh lens 270 and the image sensor 290, and the stop ST is disposed between the second lens 220 and the third lens 230.

The optical imaging system 200 may include a plurality of lenses having a high refractive index. For example, the second lens 220, the fifth lens 250, and the sixth lens 260 have a refractive index of 1.6 or more.

The optical imaging system 200 may be configured to realize a light optical system. For example, an f-number of the optical imaging system 200 is 1.696. The optical imaging system 200 may have a wide field of view. For example, an entire field of view of the optical imaging system 200 is 78.20°.

In the optical imaging system according the second example, a synthetic focal length f123 of the first to third lenses is 4.7028 mm, and a synthetic focal length f4567 of the fourth to seventh lenses is −19.2468 mm.

Figure 5:
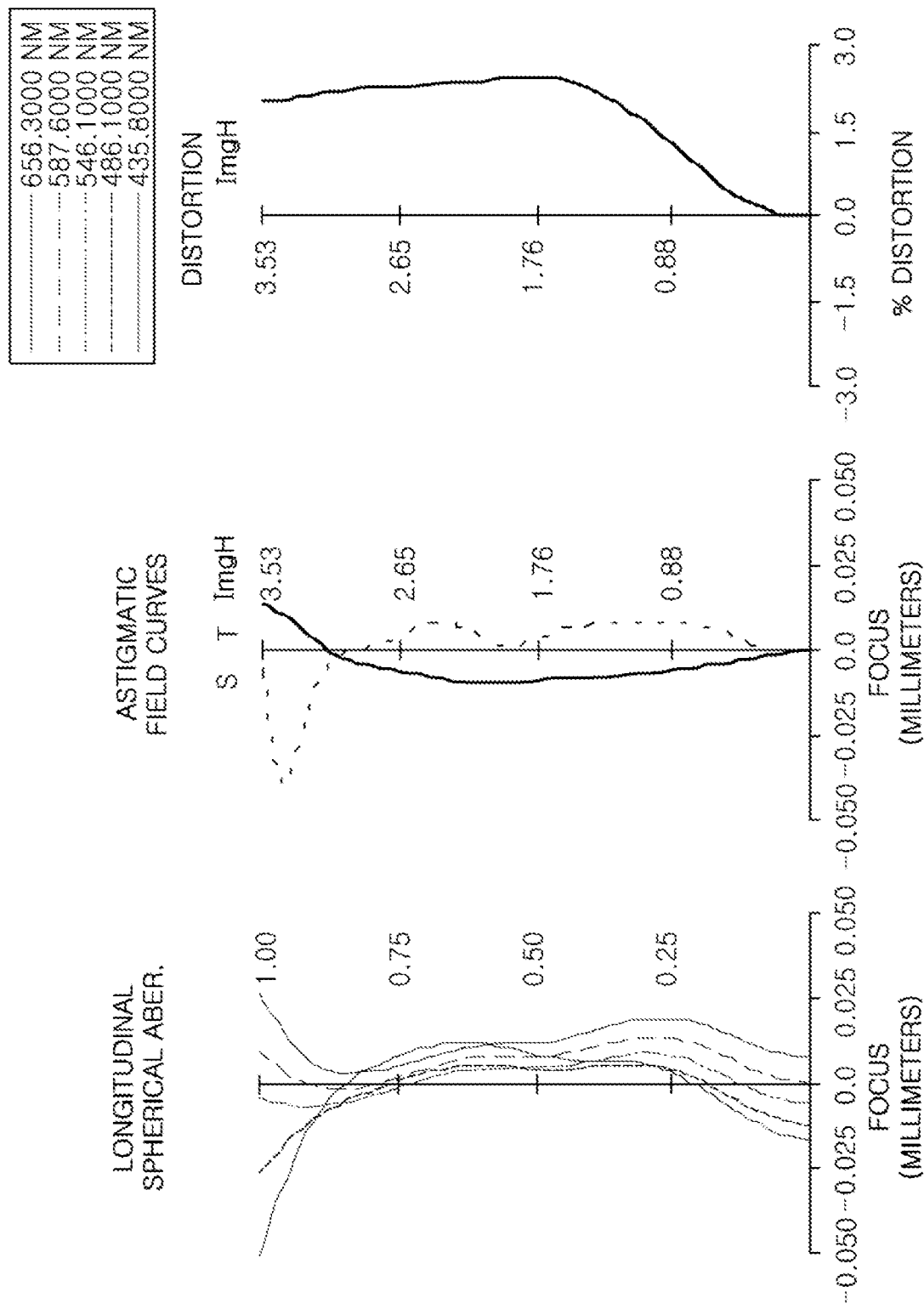
FIGS. 5 and 6 illustrate examples of curves representing aberration characteristics of the optical imaging system illustrated in FIG. 4.
Figure 6:
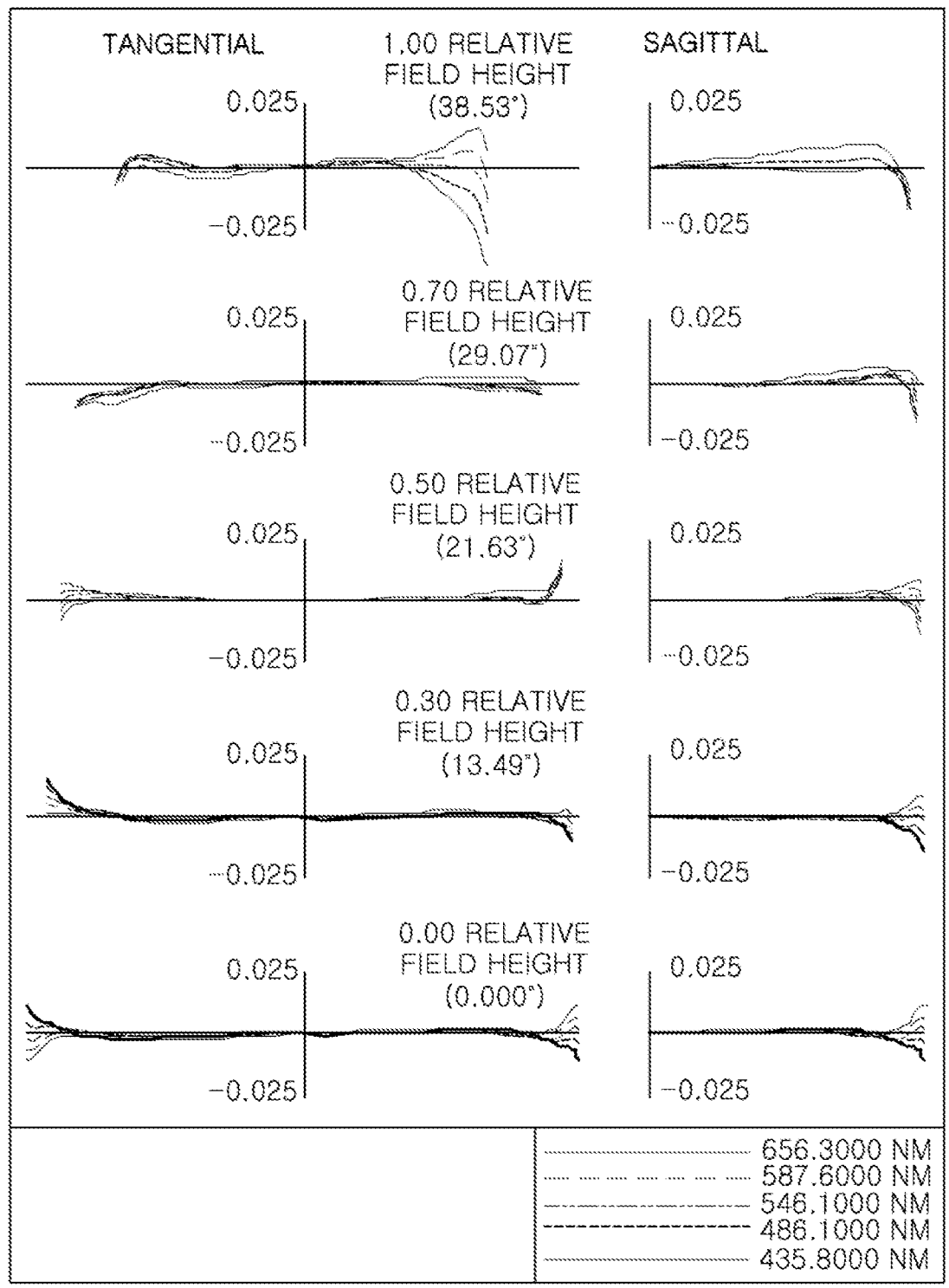

The optical imaging system configured as described above may represent aberration characteristics as illustrated in FIGS. 5 and 6. Table 3 represents characteristics of lenses of the optical imaging system according to the second example, and Table 4 represents aspherical values of the optical imaging system according to the second example.

TABLE 3

Second Example f = 4.341    f-number = 1.696    Fov = 78.204    TL = 5.132

| Surface No. | | Radius of Curvature | Thickness/ Distance | Effective Radius | Refractive Index | Abbe Number | Focal Length |
|---|---|---|---|---|---|---|---|
| S1 | First | 1.7179 | 7.688 | 1.280 | 1.544 | 56.11 | 3.658 |
| S2 | Lens | 10.5707 | 0.0982 | 1.239 | | | |
| S3 | Second | 7.8188 | 0.2203 | 1.149 | 1.661 | 20.35 | −8.473 |
| S4 | Lens | 3.2272 | 0.3321 | 1.020 | | | |
| S5 | Third | 4.9241 | 0.3162 | 1.040 | 1.544 | 56.11 | 28.140 |

TABLE 3-continued

Second Example f = 4.341    f-number = 1.696    Fov = 78.204    TL = 5.132

| Surface No. | | Radius of Curvature | Thickness/ Distance | Effective Radius | Refractive Index | Abbe Number | Focal Length |
|---|---|---|---|---|---|---|---|
| S6 | Lens | 7.0941 | 0.3059 | 1.150 | | | |
| S7 | Fourth | 8.3885 | 0.2587 | 1.234 | 1.650 | 21.52 | −66.017 |
| S8 | Lens | 6.9322 | 0.2979 | 1.466 | | | |
| S9 | Fifth | −178.3306 | 0.4405 | 1.620 | 1.614 | 25.95 | 5.119 |
| S10 | Lens | −3.0938 | 0.0303 | 1.953 | | | |
| S11 | Sixth | −5.1940 | 0.2923 | 2.307 | 1.614 | 25.95 | −4.590 |
| S12 | Lens | 6.3034 | 0.0658 | 2.479 | | | |
| S13 | Seventh | 1.8540 | 0.6824 | 2.756 | 1.534 | 55.66 | −75.081 |
| S14 | Lens | 1.5450 | 0.2883 | 2.947 | | | |
| S15 | Filter | infinity | 0.1102 | | 1.517 | 64.20 | |
| S16 | | infinity | 0.6246 | | | | |
| S17 | Imaging Plane | infinity | | | | | |

TABLE 4

| Surface | Radius of Curvature | K | A | B | C | D |
|---|---|---|---|---|---|---|
| S1 | 1.71792 | −4.282441E−01 | 4.524758E−03 | 5.945810E−03 | −8.543857E−03 | −8.789616E−04 |
| S2 | 10.57073 | −1.551205E+01 | −7.739160E−02 | 1.185737E−01 | −1.443749E−01 | 1.136845E−01 |
| S3 | 7.81884 | −2.499941E+01 | −1.246034E−01 | 2.729212E−01 | −3.192886E−01 | 2.741278E−01 |
| S4 | 3.22719 | 5.386596E+00 | −9.583140E−02 | 1.473348E−01 | 2.084246E−02 | −4.350892E−01 |
| S5 | 4.92408 | −1.145670E+01 | −5.974123E−02 | 3.981730E−02 | −6.412045E−02 | −2.981173E−02 |
| S6 | 7.09414 | 0.000000E+00 | −5.544324E−02 | −5.188451E−02 | 2.692977E−01 | −6.537924E−01 |
| S7 | 8.38850 | 0.000000E+00 | −9.617185E−02 | −1.440395E−01 | 3.803696E−01 | −4.743828E−01 |
| S8 | 6.93222 | −2.334261E+01 | −3.890146E−02 | −2.496339E−01 | 4.255458E−01 | −3.999641E−01 |
| S9 | −178.3306 | 0.000000E+00 | 1.241386E−01 | −2.559380E−01 | 2.306259E−01 | −1.505556E−01 |
| S10 | −3.09380 | 0.000000E+00 | 2.443212E−02 | 5.283087E−03 | −3.933485E−03 | −2.685532E−03 |
| S11 | −5.19402 | 0.000000E+00 | −4.411265E−03 | −1.201822E−03 | 7.179413E−04 | 1.900446E−04 |
| S12 | 6.30337 | −1.938829E+01 | −3.493402E−02 | 1.425316E−02 | −1.026703E−02 | 3.514215E−03 |
| S13 | 1.85402 | −1.569958E+00 | −2.821838E−01 | 1.296686E−01 | −3.639685E−02 | 6.679586E−03 |
| S14 | 1.54498 | −1.004996E+00 | −2.170672E−01 | 9.443463E−02 | −3.391278E−02 | 8.507309E−03 |

| Surface | E | F | G | H |
|---|---|---|---|---|
| S1 | 7.761236E−03 | −7.454473E−03 | 1.642113E−03 | 0.000000000 |
| S2 | −6.354040E−02 | 2.196750E−02 | −3.501884E−03 | 0.000000000 |
| S3 | −1.563615E−01 | 5.762380E−02 | −9.446928E−03 | 0.000000000 |
| S4 | 7.605337E−01 | −5.807853E−01 | 1.774822E−01 | 0.000000000 |
| S5 | 1.655908E−01 | −1.826365E−01 | 7.362980E−02 | 0.000000000 |
| S6 | 7.772722E−01 | −4.770021E−01 | 1.209446E−01 | 0.000000000 |
| S7 | 3.119223E−01 | −1.079585E−01 | 1.436438E−02 | 0.000000000 |
| S8 | 2.143390E−01 | −5.888975E−02 | 6.382061E−03 | 0.000000000 |
| S9 | 5.736152E−02 | −1.109974E−02 | 8.432220E−04 | 0.000000000 |
| S10 | 1.934239E−03 | −3.932323E−04 | 2.452818E−05 | 0.000000000 |
| S11 | −1.002727E−04 | 1.541093E−05 | −8.363586E−07 | 0.000000000 |
| S12 | −6.180546E−04 | 5.651138E−05 | −2.113747E−06 | 0.000000000 |
| S13 | −7.640242E−04 | 4.910477E−05 | −1.353281E−06 | 0.000000000 |
| S14 | −1.374622E−03 | 1.347801E−04 | −7.229295E−06 | 0.000000162 |

Figure 7:
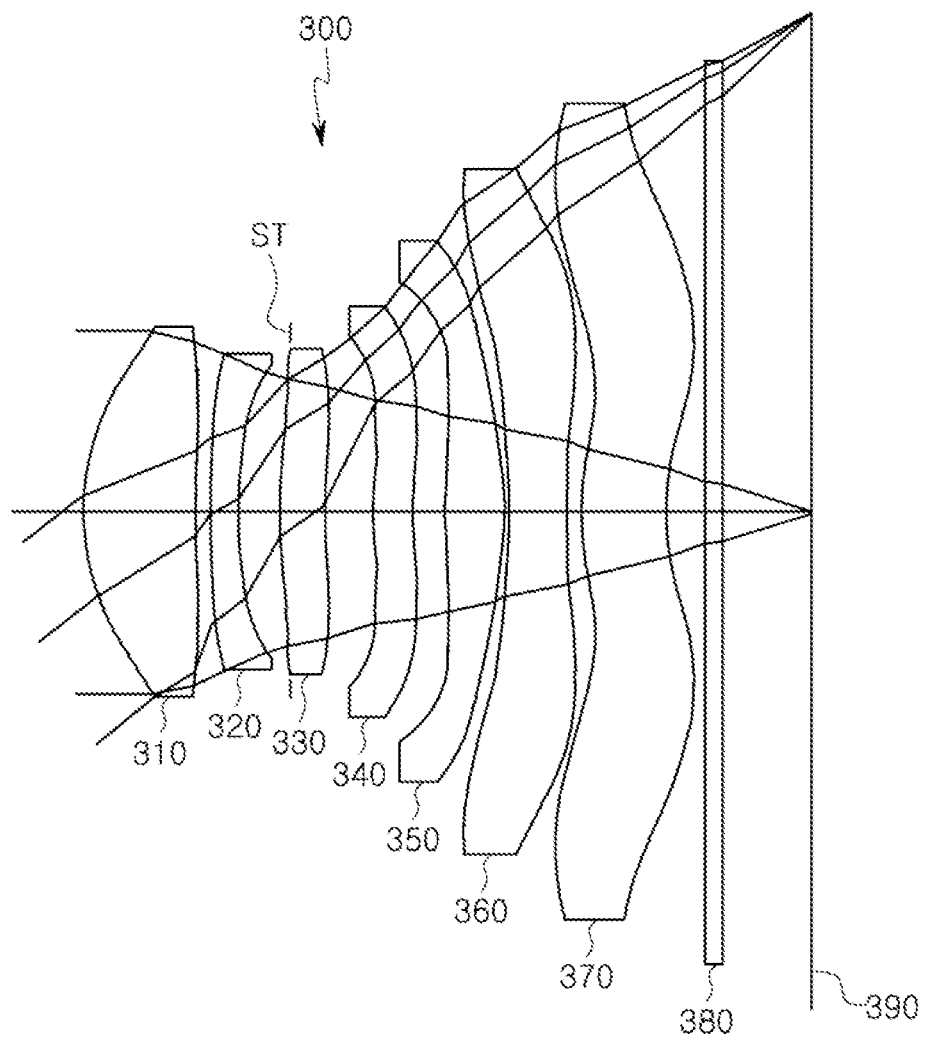
FIG. 7 is a view illustrating a third example of an optical imaging system.

An optical imaging system according to a third example will be described with reference to FIG. 7.

The optical imaging system 300 according to the third example includes a first lens 310, a second lens 320, a third lens 330, a fourth lens 340, a fifth lens 350, a sixth lens 360, and a seventh lens 370.

The first lens 310 has positive refractive power, and an object-side surface thereof is convex and an image-side surface thereof is concave. The second lens 320 has negative refractive power, and an object-side surface thereof is convex and an image-side surface thereof is concave. The third lens 330 has positive refractive power, and an object-side surface thereof is convex and an image-side surface thereof is concave. The fourth lens 340 has negative refractive power, and an object-side surface thereof is convex and an image-side surface thereof is concave. The fifth lens 350 has positive refractive power, and an object-side surface thereof is convex and an image-side surface thereof is convex. The sixth lens 360 has negative refractive power, and an object-side surface thereof is concave and an image-side surface thereof is concave. In addition, an inflection point is formed on at least one of the object-side surface and the image-side surface of the sixth lens 360. The seventh lens 370 has negative refractive power, and an object-side surface thereof is convex and an image-side surface thereof is concave. In addition, an inflection point is formed on at least one of the object-side surface and the image-side surface of the seventh lens 370.

The optical imaging system 300 further includes a filter 380, an image sensor 390, and a stop ST. The filter 380 is disposed between the seventh lens 370 and the image sensor 390, and the stop ST is disposed between the second lens 320 and the third lens 330.

The optical imaging system 300 may include a plurality of lenses having a high refractive index. For example, the second lens 320, the fifth lens 350, and the sixth lens 360 have a refractive index of 1.6 or more.

The optical imaging system 300 may be configured to realize a light optical system. For example, an f-number of the optical imaging system 300 is 1.655. The optical imaging system 300 may have a wide field of view. For example, an entire field of view of the optical imaging system 300 is 78.27°.

In the optical imaging system according the third example, a synthetic focal length f123 of the first to third lenses is 4.8342 mm, and a synthetic focal length f4567 of the fourth to seventh lenses is −28.1066 mm.

Figure 8:
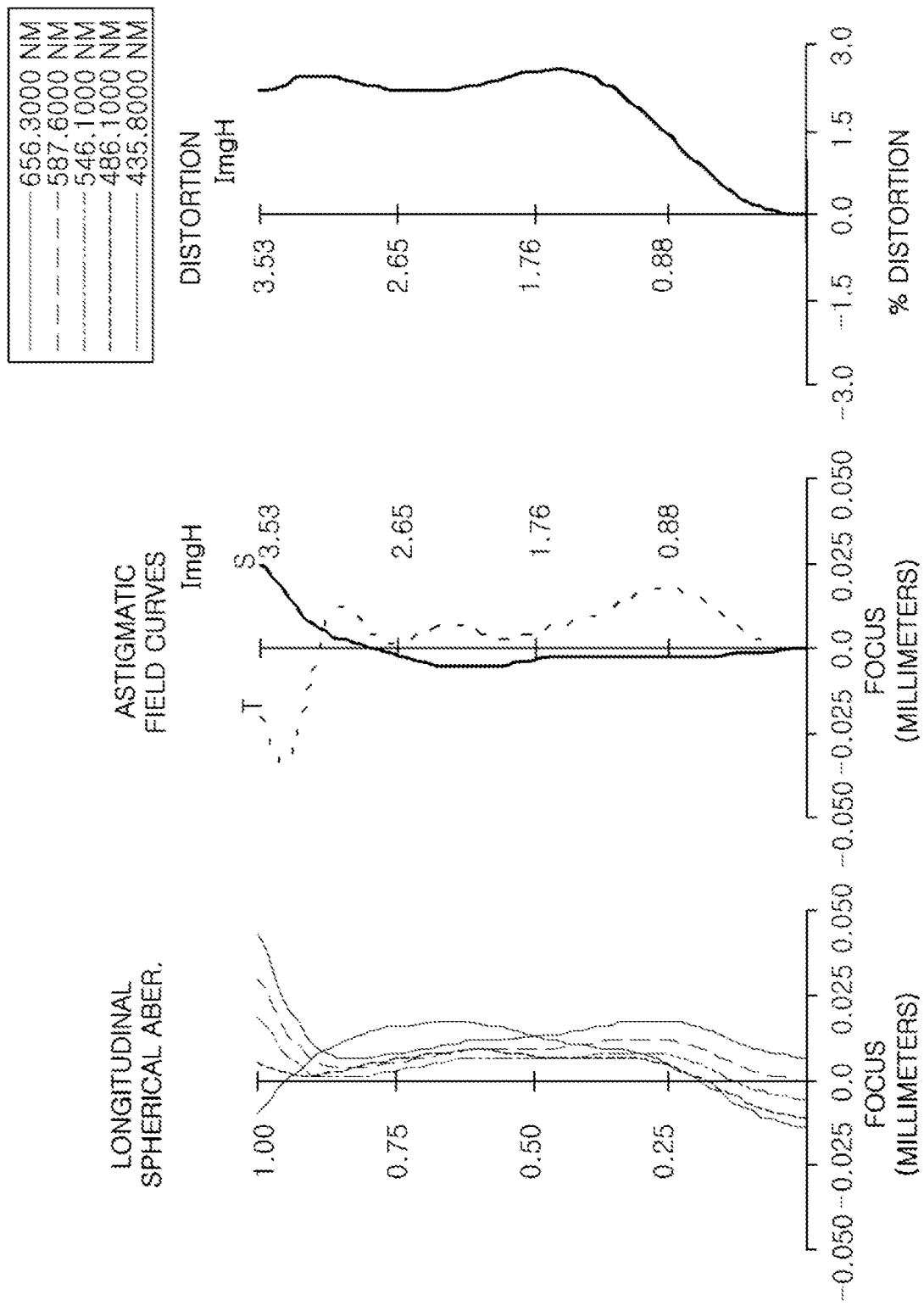
FIGS. 8 and 9 illustrate examples of curves representing aberration characteristics of the optical imaging system illustrated in FIG. 7.
Figure 9:
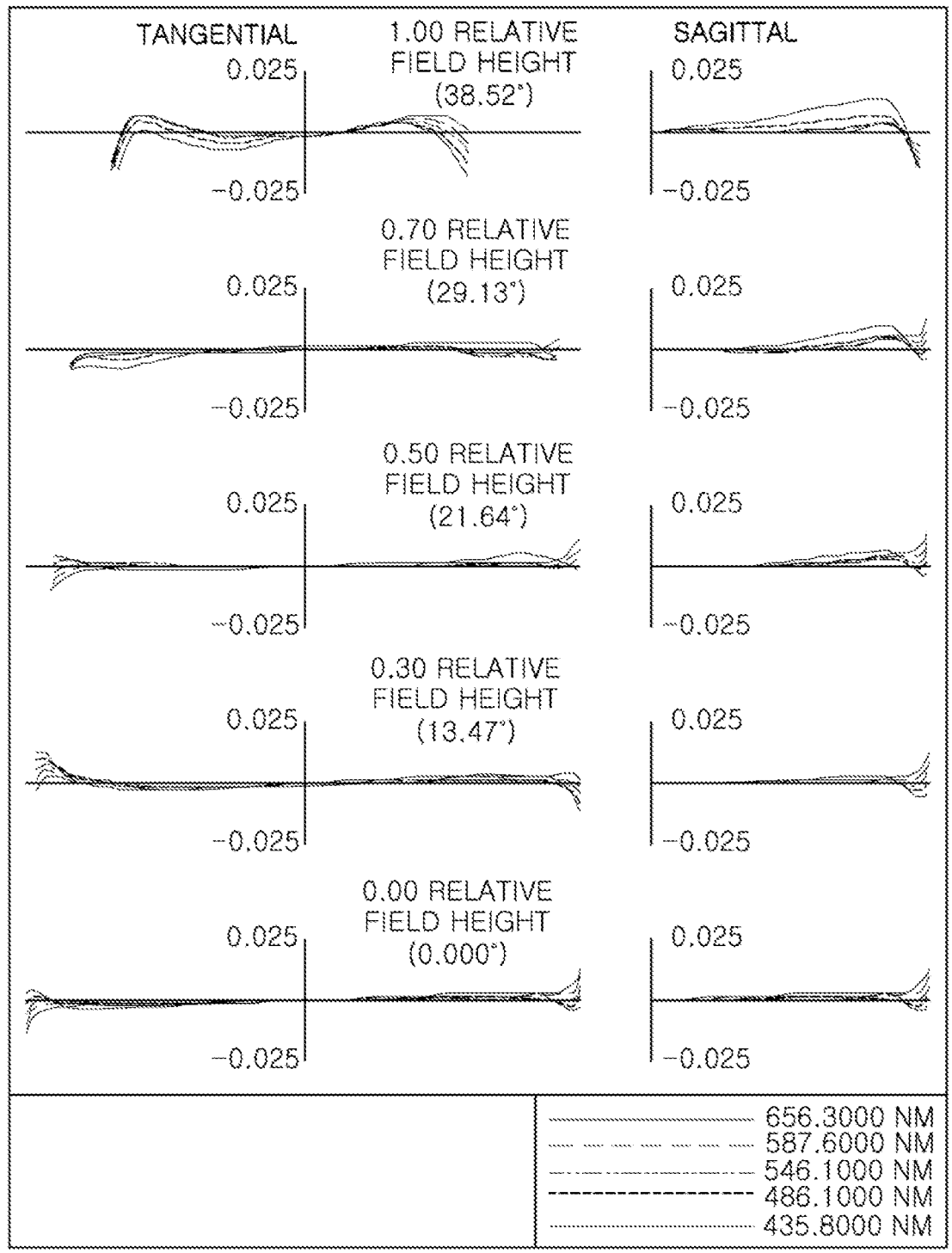

The optical imaging system configured as described above may represent aberration characteristics as illustrated in FIGS. 8 and 9. Table 5 represents characteristics of lenses of the optical imaging system according to the third example, and Table 6 represents aspherical values of the optical imaging system according to the third example.

TABLE 5

Third Example f = 4.336  f-number = 1.655  Fov = 78.267  TL = 5.185

| Surface No. | | Radius of Curvature | Thickness/ Distance | Effective Radius | Refractive Index | Abbe Number | Focal Length |
|---|---|---|---|---|---|---|---|
| S1 | First | 1.7248 | 7.947 | 1.310 | 1.544 | 56.11 | 3.731 |
| S2 | Lens | 9.6125 | 0.1086 | 1.247 | | | |
| S3 | Second | 7.5586 | 0.1958 | 1.124 | 1.661 | 20.35 | −8.110 |
| S4 | Lens | 3.1047 | 0.3070 | 1.050 | | | |
| S5 | Third | 4.3676 | 0.3119 | 1.060 | 1.544 | 56.11 | 24.902 |
| S6 | Lens | 6.2830 | 0.3571 | 1.154 | | | |
| S7 | Fourth | 6.1988 | 0.2683 | 1.262 | 1.650 | 21.52 | −22.615 |
| S8 | Lens | 4.2866 | 0.2389 | 1.501 | | | |
| S9 | Fifth | 25.0625 | 0.4177 | 1.640 | 1.614 | 25.95 | 4.328 |
| S10 | Lens | −2.9560 | 0.0300 | 1.976 | | | |
| S11 | Sixth | −6.9493 | 0.4107 | 2.322 | 1.614 | 25.95 | −4.735 |
| S12 | Lens | 5.1164 | 0.1077 | 2.521 | | | |
| S13 | Seventh | 1.7740 | 0.5998 | 2.900 | 1.534 | 55.66 | −57.584 |
| S14 | Lens | 1.4798 | 0.2989 | 2.997 | | | |
| S15 | Filter | infinity | 0.1133 | 1.517 | 64.20 | | |
| S16 | | infinity | 0.6249 | | | | |
| S17 | Imaging Plane | infinity | | | | | |

TABLE 6

| Surface | Radius of Curvature | K | A | B | C | D |
|---|---|---|---|---|---|---|
| S1 | 1.72477 | −4.143198E−01 | 3.391155E−03 | 1.194305E−02 | −2.750467E−02 | 2.956610E−02 |
| S2 | 9.61251 | −1.821792E+01 | −8.175932E−02 | 1.175785E−01 | −1.156723E−01 | 5.475888E−02 |
| S3 | 7.55865 | −2.500000E+01 | −1.521239E−01 | 3.536065E−01 | −4.104340E−01 | 3.222312E−01 |
| S4 | 3.10468 | 5.468285E+00 | −1.304343E−01 | 2.666500E−01 | −2.231377E−01 | −3.717906E−02 |
| S5 | 4.36760 | −1.515620E+01 | −5.089651E−02 | 4.150644E−03 | 1.018949E−01 | −3.686665E−01 |
| S6 | 6.28297 | 0.000000E+00 | −6.027448E−02 | −1.425108E−02 | 1.280785E−01 | −3.194428E−01 |
| S7 | 6.19878 | 0.000000E+00 | −1.352755E−01 | −1.150447E−02 | 7.512884E−02 | −3.280086E−02 |
| S8 | 4.28657 | −2.313876E+01 | −5.310718E−02 | −1.538950E−01 | 2.326302E−01 | −1.883593E−01 |
| S9 | 25.0625 | 0.000000E+00 | 7.753748E−02 | −1.417255E−01 | 1.054394E−01 | −5.930096E−02 |
| S10 | −2.95600 | 0.000000E+00 | 3.539024E−02 | 1.689876E−02 | −1.695738E−02 | 5.691204E−03 |
| S11 | −6.94930 | 0.000000E+00 | 2.108394E−02 | −3.606298E−02 | 1.866212E−02 | −4.515389E−03 |
| S12 | 5.11637 | −1.642973E+01 | −2.612352E−02 | −1.566239E−04 | 4.456932E−04 | −2.218524E−04 |
| S13 | 1.77397 | −1.619400E+00 | −2.522239E−01 | 8.929233E−02 | −1.681275E−02 | 1.964910E−03 |
| S14 | 1.47979 | −9.440866E−01 | −2.162879E−01 | 8.077374E−02 | −2.473915E−02 | 5.078867E−03 |

| Surface | E | F | G | H |
|---|---|---|---|---|
| S1 | −1.831461E−02 | 4.187780E−03 | −3.786021E−04 | 0.000000000 |
| S2 | −7.883824E−03 | −3.502036E−03 | 1.068943E−03 | 0.000000000 |
| S3 | −1.581818E−01 | 4.892672E−02 | −7.083809E−03 | 0.000000000 |
| S4 | 2.965595E−01 | −2.637076E−01 | 8.366529E−02 | 0.000000000 |
| S5 | 5.259439E−01 | −3.698491E−01 | 1.064178E−01 | 0.000000000 |
| S6 | 3.562181E−01 | −2.049860E−01 | 4.892350E−02 | 0.000000000 |
| S7 | −4.413231E−02 | 4.296886E−02 | −1.172816E−02 | 0.000000000 |
| S8 | 8.764931E−02 | −2.112318E−02 | 2.024663E−03 | 0.000000000 |
| S9 | 1.957156E−02 | −3.338879E−03 | 2.288494E−04 | 0.000000000 |

TABLE 6-continued

| | | | |
|---|---|---|---|
| S10 | −1.105017E−03 | 1.462230E−04 | −1.170864E−05 | 0.000000000 |
| S11 | 5.570600E−04 | −3.063251E−05 | 4.011896E−07 | 0.000000000 |
| S12 | 3.855993E−05 | −5.465888E−07 | −1.569024E−07 | 0.000000000 |
| S13 | −1.504767E−04 | 7.454158E−06 | −1.875692E−07 | 0.000000000 |
| S14 | −6.147084E−04 | 3.947501E−05 | −1.036715E−06 | 0.000000000 |

Figure 10:
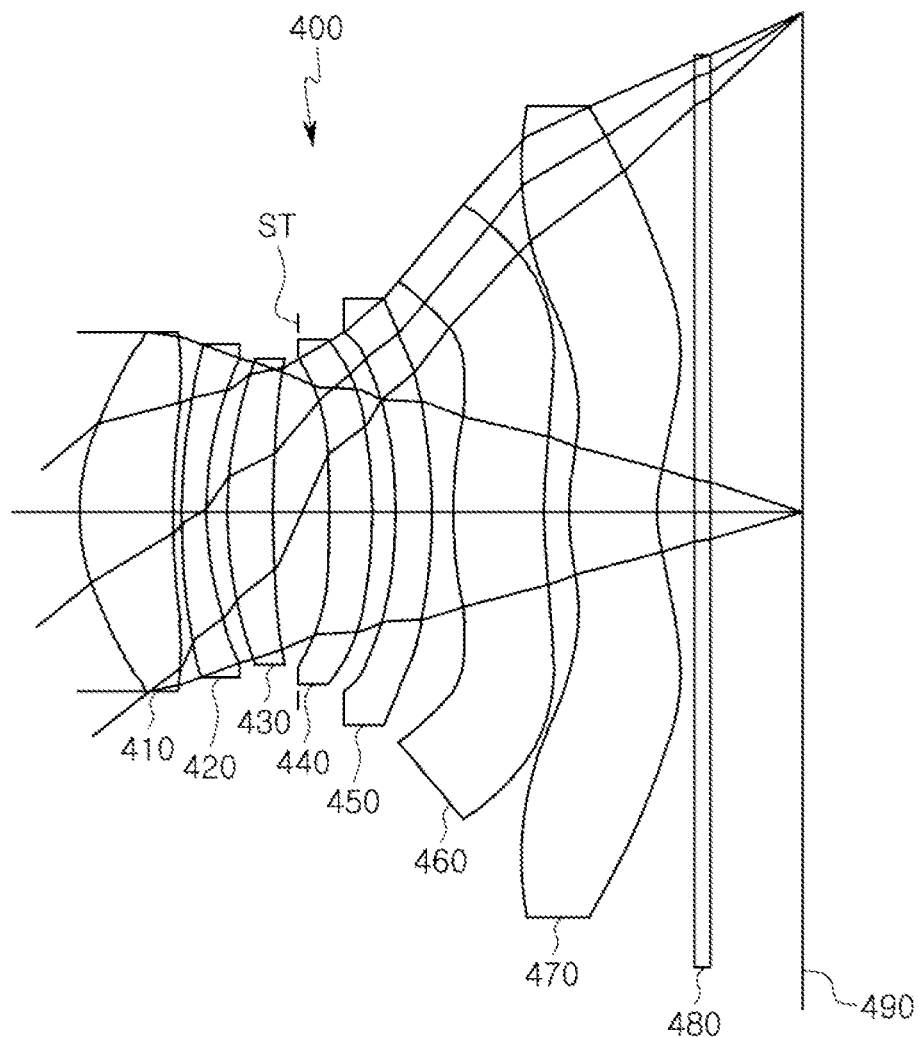
FIG. 10 is a view illustrating a fourth example of an optical imaging system.

An optical imaging system according to a fourth example will be described with reference to FIG. 10.

The optical imaging system 400 according to the fourth example includes a first lens 410, a second lens 420, a third lens 430, a fourth lens 440, a fifth lens 450, a sixth lens 460, and a seventh lens 470.

The first lens 410 has positive refractive power, and an object-side surface thereof is convex and an image-side surface thereof is concave. The second lens 420 has negative refractive power, and an object-side surface thereof is convex and an image-side surface thereof is concave. The third lens 430 has positive refractive power, and an object-side surface thereof is convex and an image-side surface thereof is concave. The fourth lens 440 has positive refractive power, and an object-side surface thereof is concave and an image-side surface thereof is convex. The fifth lens 450 has negative refractive power, and an object-side surface thereof is concave and an image-side surface thereof is convex. The sixth lens 460 has positive refractive power, and an object-side surface thereof is convex and an image-side surface thereof is concave. In addition, an inflection point is formed on at least one of the object-side surface and the image-side surface of the sixth lens 460. The seventh lens 470 has negative refractive power, and an object-side surface thereof is convex and an image-side surface thereof is concave. In addition, an inflection point is formed on at least one of the object-side surface and the image-side surface of the seventh lens 470.

The optical imaging system 400 further includes a filter 480, an image sensor 490, and a stop ST. The filter 480 is disposed between the seventh lens 470 and the image sensor 490, and the stop ST is disposed between the third lens 430 and the fourth lens 440.

The optical imaging system 400 may include a plurality of lenses having a high refractive index. For example, the second lens 420, the fifth lens 450, and the sixth lens 460 have a refractive index of 1.6 or more. For example, the second lens 420, the fifth lens 450, and the sixth lens 460 have a refractive index that is greater than 1.63 and less than 2.0.

The optical imaging system 400 may be configured to realize a light optical system. For example, an f-number of the optical imaging system 400 is 1.687. The optical imaging system 400 may have a wide field of view. For example, an entire field of view of the optical imaging system 400 is 78.93°.

In the optical imaging system according the fourth example, a synthetic focal length f123 of the first to third lenses is 4.3546 mm, and a synthetic focal length f4567 of the fourth to seventh lenses is −12.4587 mm.

Figure 11:
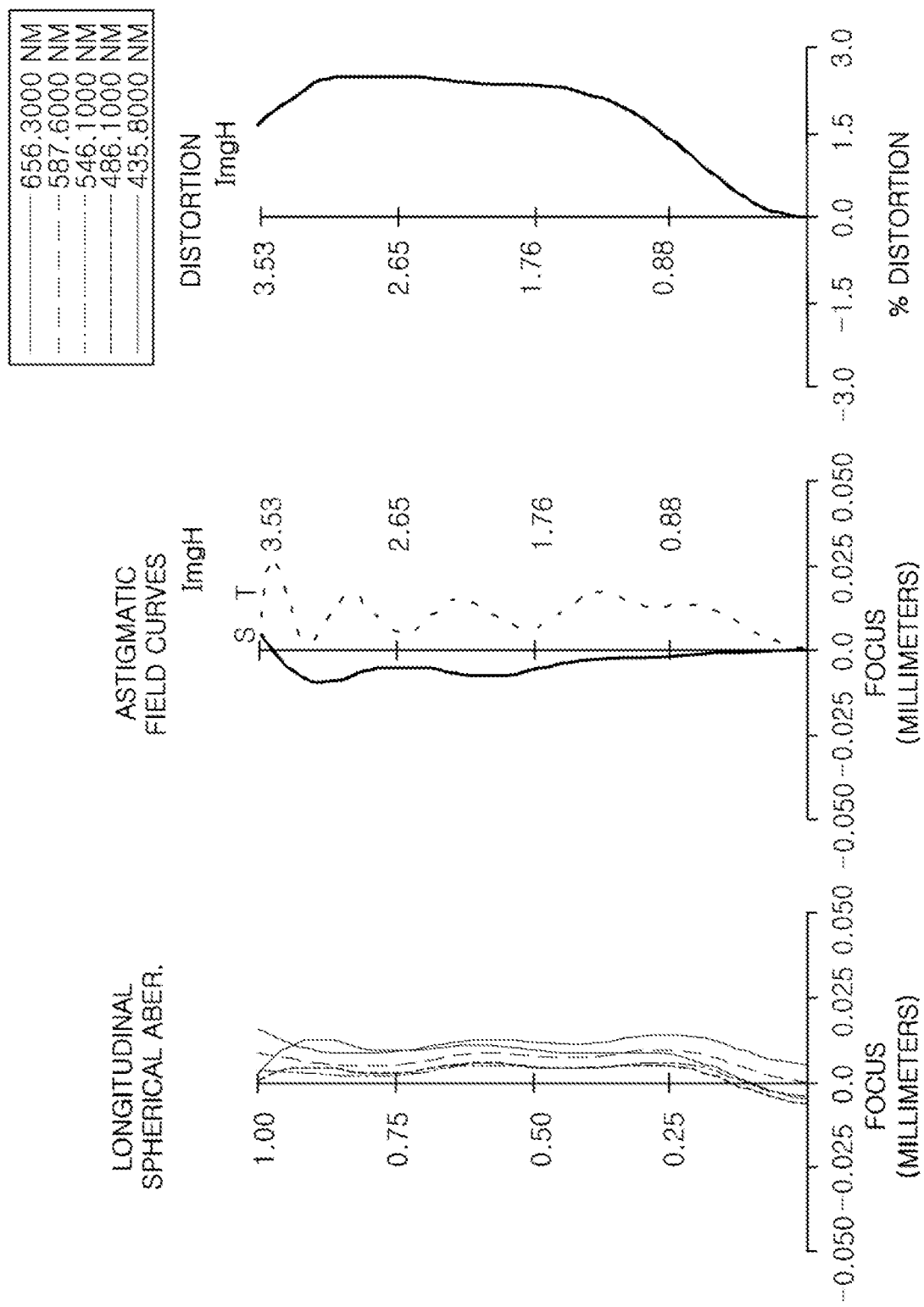
FIGS. 11 and 12 illustrate examples of curves representing aberration characteristics of the optical imaging system illustrated in FIG. 10.
Figure 12:
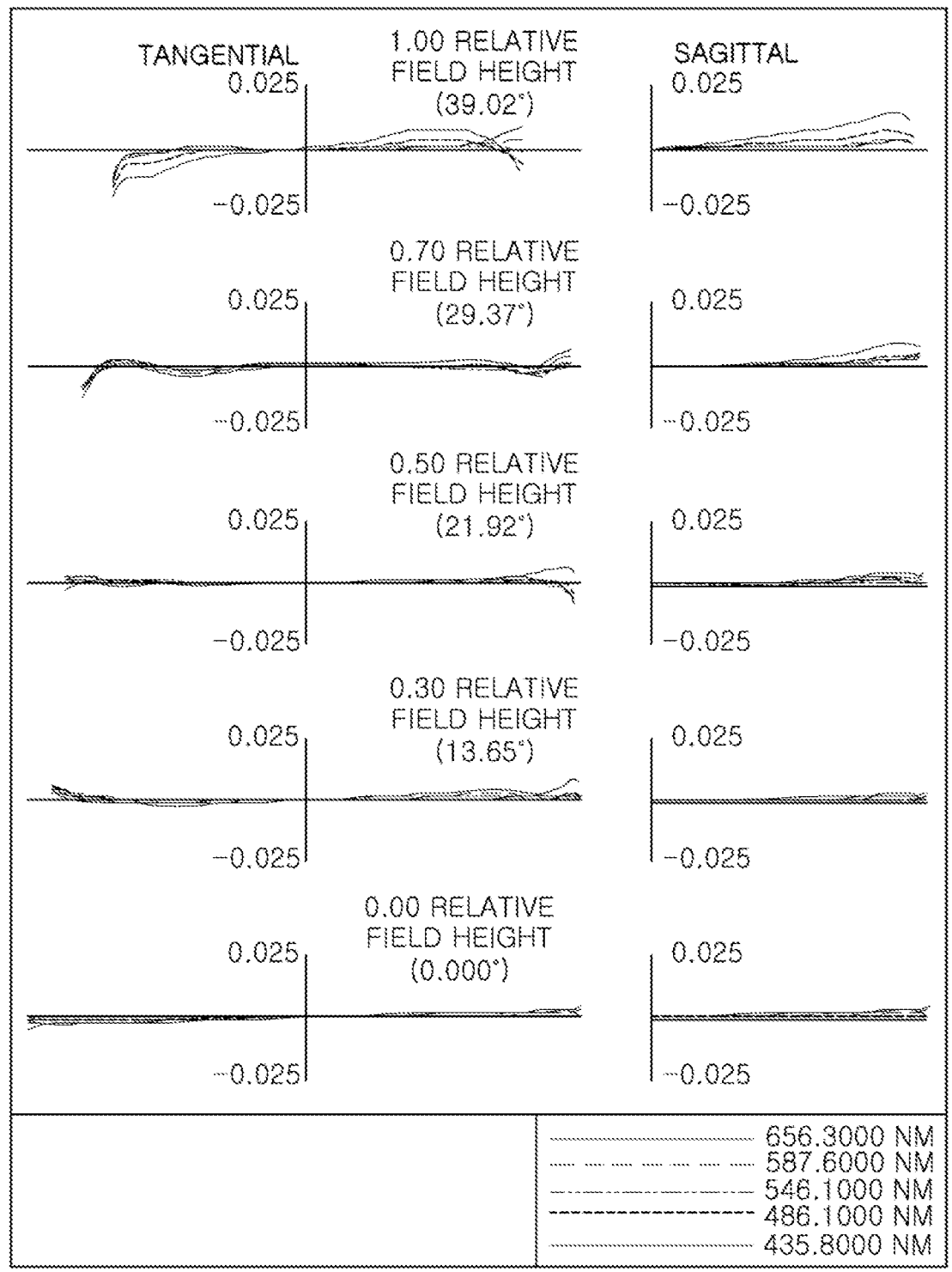

The optical imaging system configured as described above may represent aberration characteristics as illustrated in FIGS. 11 and 12. Table 7 represents characteristics of lenses of the optical imaging system according to the fourth example, and Table 8 represents aspherical values of the optical imaging system according to the fourth example.

TABLE 7

Fourth Example

| f = 4.285 | | f-number = 1.687 | Fov = 78.930 | | TL = 5.137 | |
|---|---|---|---|---|---|---|
| Surface No. | | Radius of Curvature | Thickness/ Distance | Effective Radius | Refractive Index | Abbe Number | Focal Length |
| S1 | First | 1.7749 | 0.6614 | 1.270 | 1.544 | 56.11 | 4.543 |
| S2 | Lens | 5.4674 | 0.0638 | 1.231 | | | |
| S3 | Second | 3.0715 | 0.1699 | 1.172 | 1.661 | 20.35 | −9.326 |
| S4 | Lens | 2.0051 | 0.1569 | 1.076 | | | |
| S5 | Third | 2.8430 | 0.3189 | 1.070 | 1.544 | 56.11 | 8.653 |
| S6 | Lens | 6.8926 | 0.4019 | 1.062 | | | |
| S7 | Fourth | −10.4787 | 0.2975 | 1.085 | 1.544 | 56.11 | 24.098 |
| S8 | Lens | −5.8824 | 0.1698 | 1.213 | | | |
| S9 | Fifth | −3.5607 | 0.2493 | 1.280 | 1.650 | 21.52 | −8.449 |
| S10 | Lens | −10.3932 | 0.1725 | 1.508 | | | |
| S11 | Sixth | 3.5661 | 0.6381 | 1.633 | 1.639 | 23.52 | 25.651 |
| S12 | Lens | 4.2393 | 0.1897 | 2.180 | | | |
| S13 | Seventh | 1.8950 | 0.6222 | 2.950 | 1.534 | 55.66 | −31.619 |
| S14 | Lens | 1.5091 | 0.2664 | 2.867 | | | |
| S15 | Filter | infinity | 0.1100 | | 1.517 | 64.20 | |
| S16 | | infinity | 0.6483 | | | | |
| S17 | Imaging Plane | | | | | | |

TABLE 8

| Surface | Radius of Curvature | K | A | B | C | D |
|---|---|---|---|---|---|---|
| S1 | 1.77485 | 5.959662E−02 | −5.388128E−03 | 1.360759E−02 | −5.143389E−02 | 8.478375E−02 |
| S2 | 5.46739 | −1.417538E+01 | −4.306502E−02 | 9.288308E−02 | −2.325622E−01 | 3.534198E−01 |
| 83 | 3.07155 | −1.552685E+01 | −8.663062E−02 | 1.605935E−01 | −3.452469E−01 | 5.907441E−01 |
| 84 | 2.00514 | −3.949547E+00 | −8.211001E−02 | 1.383647E−01 | −2.641935E−01 | 4.599045E−01 |
| 85 | 2.84301 | 2.223813E+00 | −4.707033E−02 | 3.782876E−02 | −2.255185E−01 | 5.291208E−01 |
| S6 | 6.89263 | 1.017907E+01 | −1.144238E−02 | −2.988196E−02 | 7.285914E−02 | −2.239369E−01 |
| S7 | −10.47874 | 8.282273E+01 | −7.058935E−02 | 1.455709E−01 | −8.025071E−01 | 1.955550E+00 |
| S8 | −5.88245 | 2.077555E+01 | −4.683581E−02 | 3.236939E−01 | −1.407217E+00 | 3.032509E+00 |
| S9 | −3.5607 | −2.864040E+00 | 3.741685E−03 | 3.250115E−02 | −3.738043E−01 | 9.384328E−01 |
| S10 | −10.39320 | 3.862747E+01 | 1.299731E−02 | −3.772109E−01 | 7.125089E−01 | −7.442798E−01 |
| S11 | 3.56610 | −2.638186E+01 | 1.205689E−01 | −4.049356E−01 | 5.527146E−01 | −5.266590E−01 |
| S12 | 4.23932 | −4.061633E+01 | 7.345040E−03 | −2.956014E−02 | 8.087935E−03 | 4.022267E−04 |
| S13 | 1.89502 | −9.242441E−01 | −3.564973E−01 | 1.501760E−01 | −3.346026E−02 | 4.075485E−03 |
| S14 | 1.50907 | −9.893056E−01 | −2.639672E−01 | 1.227534E−01 | −4.522021E−02 | 1.157040E−02 |

| Surface | E | F | G | H |
|---|---|---|---|---|
| S1 | −9.091267E−02 | 5.809972E−02 | −2.160555E−02 | 0.003359683 |
| S2 | −3.510032E−01 | 2.132389E−01 | −7.148945E−02 | 0.010070979 |
| S3 | −6.559703E−01 | 4.479719E−01 | −1.672602E−01 | 0.025994699 |
| S4 | −5.076743E−01 | 3.237747E−01 | −8.923737E−02 | 0.002865033 |
| S5 | −7.300271E−01 | 6.097782E−01 | −2.587448E−01 | 0.043055003 |
| S6 | 3.867412E−01 | −3.403894E−01 | 1.582813E−01 | −0.027352427 |
| S7 | −2.930747E+00 | 2.664231E+00 | −1.328059E+00 | 0.278695839 |
| S8 | −3.988372E+00 | 3.151408E+00 | −1.358967E+00 | 0.245214958 |
| S9 | −1.290963E+00 | 9.983598E−01 | −4.024315E−01 | 0.065180072 |
| S10 | 4.665404E−01 | −1.693862E−01 | 3.264930E−02 | −0.002582809 |
| S11 | 3.282138E−01 | −1.282097E−01 | 2.804537E−02 | −0.002569597 |
| S12 | −1.143148E−03 | 3.729914E−04 | −5.312028E−05 | 0.000002946 |
| S13 | −2.106308E−04 | −6.300106E−06 | 1.245585E−06 | −0.000000041 |
| S14 | −1.886107E−03 | 1.848884E−04 | −9.910713E−06 | 0.000000223 |

Figure 13:
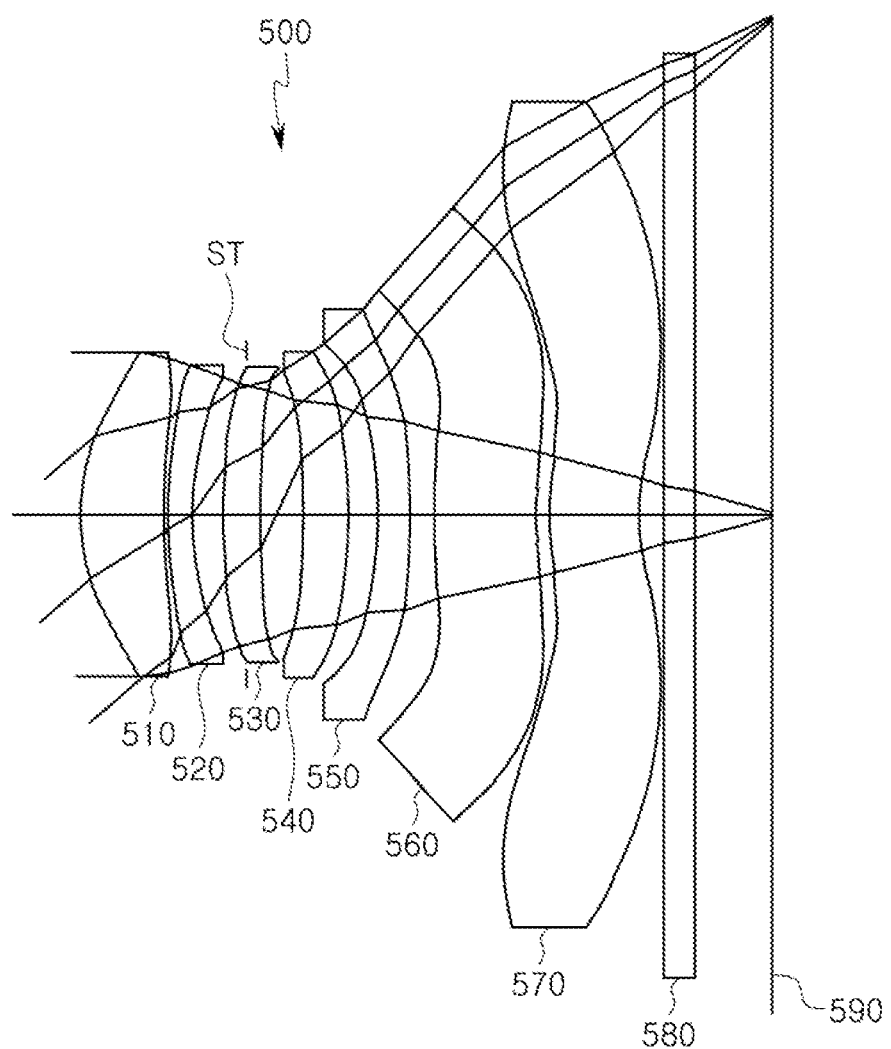
FIG. 13 is a view of a fifth example of an optical imaging system.

An optical imaging system according to a fifth example will be described with reference to FIG. 13.

The optical imaging system 500 according to the fifth example includes a first lens 510, a second lens 520, a third lens 530, a fourth lens 540, a fifth lens 550, a sixth lens 560, and a seventh lens 570.

The first lens 510 has positive refractive power, and an object-side surface thereof is convex and an image-side surface thereof is concave. The second lens 520 has negative refractive power, and an object-side surface thereof is convex and an image-side surface thereof is concave. The third lens 530 has positive refractive power, and an object-side surface thereof is convex and an image-side surface thereof is concave. The fourth lens 540 has positive refractive power, and an object-side surface thereof is concave and an image-side surface thereof is convex. The fifth lens 550 has negative refractive power, and an object-side surface thereof is concave and an image-side surface thereof is convex. The sixth lens 560 has negative refractive power, and an object-side surface thereof is convex and an image-side surface thereof is concave. In addition, an inflection point is formed on at least one of the object-side surface and the image-side surface of the sixth lens 560. The seventh lens 570 has negative refractive power, and an object-side surface thereof is convex and an image-side surface thereof is concave. In addition, an inflection point is formed on at least one of the object-side surface and the image-side surface of the seventh lens 570.

The optical imaging system 500 further includes a filter 580, an image sensor 590, and a stop ST. The filter 580 is disposed between the seventh lens 570 and the image sensor 590, and the stop ST is disposed between the second lens 520 and the third lens 530.

The optical imaging system 500 may include a plurality of lenses having a high refractive index. For example, the second lens 520, the fifth lens 550, and the sixth lens 560 each has a refractive index of 1.65 or more.

The optical imaging system 500 may be configured to realize a light optical system. For example, an f-number of the optical imaging system 500 is 1.783. The optical imaging system 500 may have a wide field of view. For example, an entire field of view of the optical imaging system 500 is 81.67°.

In the optical imaging system according the fifth example, a synthetic focal length f123 of the first to third lenses is 4.0082 mm, and a synthetic focal length f4567 of the fourth to seventh lenses is −8.5519 mm.

Figure 14:
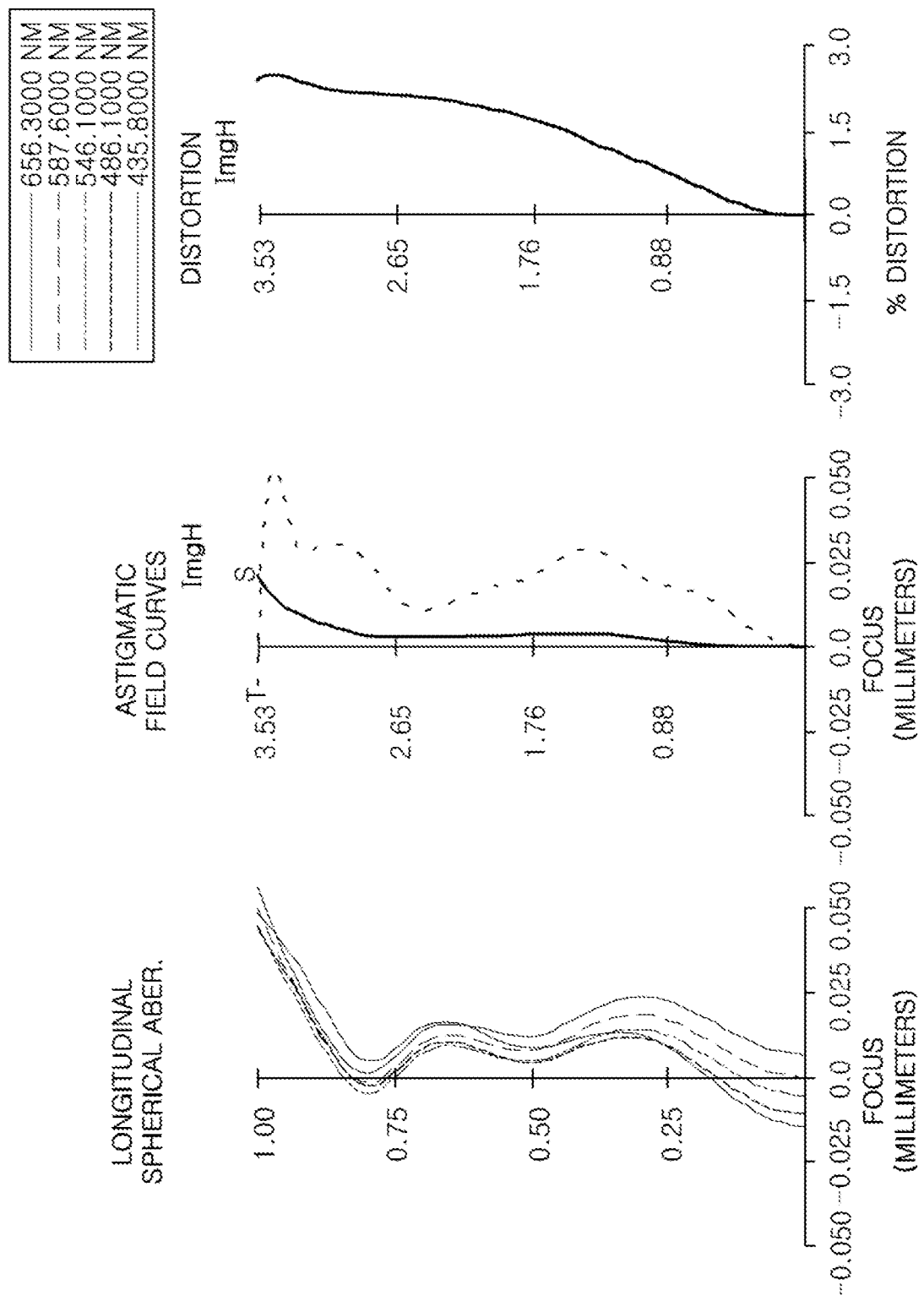
FIGS. 14 and 15 illustrate examples of curves representing aberration characteristics of the optical imaging system illustrated in FIG. 13.
Figure 15:
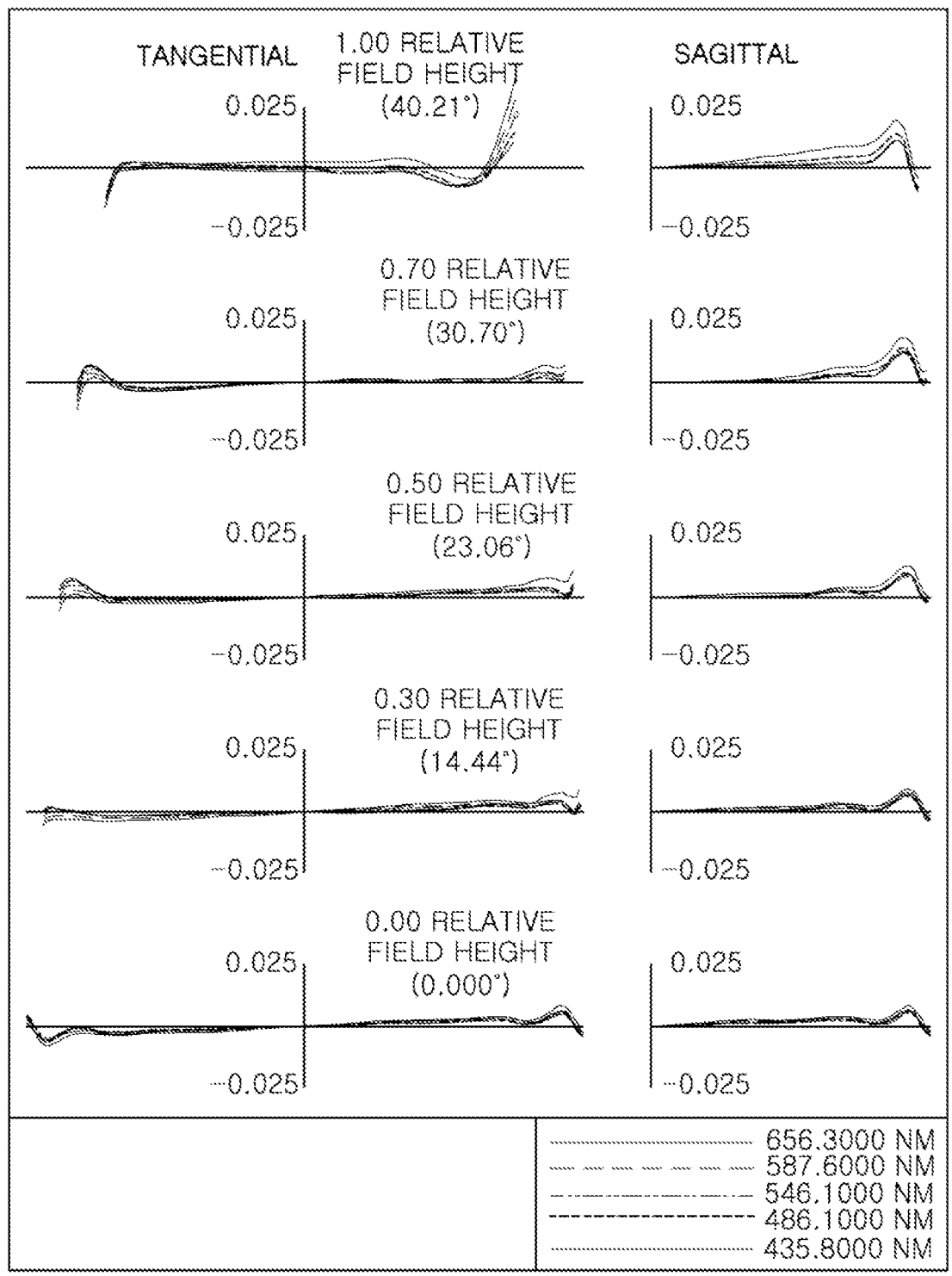

The optical imaging system configured as described above may represent aberration characteristics as illustrated in FIGS. 14 and 15. Table 9 represents characteristics of lenses of the optical imaging system according to the fifth example, and Table 10 represents aspherical values of the optical imaging system according to the fifth example.

TABLE 9

Fifth Example f = 4.082    f-number = 1.783    Fov = 81.666    TL = 4.880

| Surface No. | | Radius of Curvature | Thickness/ Distance | Effective Radius | Refractive Index | Abbe Number | Focal Length |
|---|---|---|---|---|---|---|---|
| S1 | First | 1.6328 | 0.5929 | 1.145 | 1.544 | 56.11 | 3.896 |
| S2 | Lens | 6.1955 | 0.0200 | 1.110 | | | |
| S3 | Second | 2.7914 | 0.1662 | 1.053 | 1.661 | 20.35 | −11.759 |
| S4 | Lens | 2.0053 | 0.2253 | 0.965 | | | |
| S5 | Third | 3.8029 | 0.2659 | 0.935 | 1.544 | 56.11 | 13.964 |
| S6 | Lens | 7.4260 | 0.2888 | 1.030 | | | |
| S7 | Fourth | −10.6351 | 0.3235 | 1.025 | 1.544 | 56.11 | 20.782 |
| S8 | Lens | −5.5393 | 0.2158 | 1.156 | | | |
| S9 | Fifth | −3.1872 | 0.2300 | 1.205 | 1.650 | 21.52 | −8.039 |
| S10 | Lens | −8.3961 | 0.1676 | 1.559 | | | |
| S11 | Sixth | 3.6940 | 0.7181 | 1.602 | 1.650 | 21.52 | −178.423 |
| S12 | Lens | 3.3058 | 0.1000 | 2.196 | | | |
| S13 | Seventh | 1.8894 | 0.6334 | 2.795 | 1.534 | 55.66 | −71.449 |
| S14 | Lens | 1.5902 | 0.1712 | 3.015 | | | |
| S15 | Filter | infinity | 0.2100 | 1.517 | 64.20 | | |
| S16 | | infinity | 0.5517 | | | | |
| S17 | Imaging Plane | | | | | | |

TABLE 10

| Surface | Radius of Curvature | K | A | B | C | D |
|---|---|---|---|---|---|---|
| S1 | 1.63280 | 2.608948E−02 | −1.180297E−02 | 5.912673E−02 | −2.071003E−01 | 3.636707E−01 |
| S2 | 6.19551 | −1.375731E+01 | −9.343538E−02 | 2.260252E−01 | −4.775557E−01 | 6.909691E−01 |
| S3 | 2.79143 | −9.000159E+00 | −9.888735E−02 | 1.743930E−01 | −1.996546E−01 | 1.708685E−02 |
| S4 | 2.00535 | −2.000010E+00 | −5.700760E−02 | 1.237706E−01 | −6.757765E−01 | 2.675257E+00 |
| S5 | 3.80289 | 5.396759E+00 | −3.703712E−02 | −1.095054E−01 | 7.407411E−01 | −3.028763E+00 |
| S6 | 7.42603 | −3.142758E+00 | −1.300489E−02 | −1.740201E−01 | 8.812542E−01 | −2.662834E+00 |
| S7 | −10.63513 | −5.344960E+01 | −7.901020E−02 | −1.377806E−02 | −1.353535E−01 | 2.618856E−01 |
| S8 | −5.53925 | 1.647567E+01 | −3.718506E−02 | 8.145438E−02 | −5.832553E−01 | 1.339305E+00 |
| S9 | −3.1872 | −1.886335E+00 | −2.388695E−02 | 1.411841E−01 | −6.424439E−01 | 1.297897E+00 |
| S10 | −8.39612 | 2.913499E+01 | −1.232590E−01 | 5.420246E−02 | −1.999485E−02 | 9.631672E−02 |
| S11 | 3.69405 | −4.999995E+01 | 1.354135E−01 | −2.672998E−01 | 3.866085E−01 | −3.512278E−01 |
| S12 | 3.30581 | −3.458415E+01 | −4.778113E−02 | −1.890693E−02 | 3.147563E−02 | −1.950289E−02 |
| S13 | 1.88943 | −9.218118E−01 | −4.237182E−01 | 2.552317E−01 | −9.521465E−02 | 2.287394E−02 |
| S14 | 1.59017 | −9.276724E−01 | −2.710924E−01 | 1.458954E−01 | −5.822372E−02 | 1.574548E−02 |

| Surface | E | F | G | H |
|---|---|---|---|---|
| S1 | −3.777332E−01 | 2.151853E−01 | −6.296787E−02 | 0.006237525 |
| S2 | −6.905273E−01 | 4.477653E−01 | −1.716854E−01 | 0.029121342 |
| S3 | 4.211534E−01 | −6.028402E−01 | 3.493936E−01 | −0.075071581 |
| S4 | −5.848008E+00 | 7.361610E+00 | −4.903291E+00 | 1.340907716 |
| S5 | 6.925041E+00 | −8.596335E+00 | 5.589189E+00 | −1.486573473 |
| S6 | 4.855620E+00 | −4.905205E+00 | 2.619759E+00 | −0.573681312 |
| S7 | 3.247314E−02 | −4.629144E−01 | 5.187094E−01 | −0.198234726 |
| S8 | −1.713490E+00 | 1.315730E+00 | −5.547641E−01 | 0.097841940 |
| S9 | −1.591851E+00 | 1.155108E+00 | −4.590689E−01 | 0.076726075 |
| S10 | −1.771018E−01 | 1.350382E−01 | −4.638649E−02 | 0.005981131 |
| S11 | 2.004651E−01 | −7.280221E−02 | 1.569418E−02 | −0.001499030 |
| S12 | 6.210579E−03 | −1.066927E−03 | 9.178985E−05 | −0.000002891 |
| S13 | −3.474639E−03 | 3.198017E−04 | −1.620900E−05 | 0.000000347 |
| S14 | −2.751630E−03 | 2.944932E−04 | −1.744426E−05 | 0.000000436 |

Table 11 represents values of Conditional Expressions of the optical imaging systems according to the first to fifth examples.

TABLE 11

| Conditional Expression | First Example | Second Example | Third Example | Fourth Example | Fifth Example |
|---|---|---|---|---|---|
| TL/f | 1.2335 | 1.1823 | 1.1959 | 1.1987 | 1.1955 |
| TL/ImgH | 1.5117 | 1.4547 | 1.4697 | 1.4560 | 1.3833 |
| Td/f | 1.0057 | 0.9466 | 0.9567 | 0.9596 | 0.9669 |
| f1/f | 1.2358 | 0.8427 | 0.8604 | 1.0602 | 0.9544 |
| f3/f | 1.5530 | 6.4825 | 5.7431 | 2.0194 | 3.4206 |
| f123/f | 1.0336 | 1.0834 | 1.1149 | 1.0162 | 0.9818 |
| f4567/f | −2.8105 | −4.4515 | −6.5006 | −2.8815 | −1.9779 |
| f1/f2 | −0.5683 | −0.4317 | −0.4600 | −0.4871 | −0.3313 |

TABLE 11-continued

| Conditional Expression | First Example | Second Example | Third Example | Fourth Example | Fifth Example |
|---|---|---|---|---|---|
| r4/f | 0.5161 | 0.7434 | 0.7160 | 0.4679 | 0.4912 |
| r12/f | 0.7324 | 1.4521 | 1.1800 | 0.9893 | 0.8098 |
| (r3 − r4)/(r3 + r4) | 0.2321 | 0.4157 | 0.4177 | 0.2101 | 0.1639 |
| |f/f1| + |f/f2| | 1.2691 | 1.6990 | 1.6969 | 1.4027 | 1.3949 |
| Σcti (i = 1, 2, 3 ... 7) | 3.1572 | 2.9792 | 2.9989 | 2.9574 | 2.9299 |
| ImgH/f | 0.8160 | 0.8127 | 0.8136 | 0.8233 | 0.8642 |
| ct1/ct2 | 4.4063 | 3.4900 | 4.0589 | 3.8920 | 3.5685 |
| v1 − v2 | 35.760 | 35.760 | 35.760 | 35.760 | 35.760 |
| Nmax | 1.6612 | 1.6612 | 1.6612 | 1.6612 | 1.6612 |
| ctmin | 0.1600 | 0.2203 | 0.1958 | 0.1699 | 0.1662 |

According to the examples above, performance of a small camera module may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising positive refractive power and a concave image-side surface;
a second lens comprising negative refractive power;
a third lens comprising a refractive power;
a fourth lens comprising a refractive power;
a fifth lens comprising a convex image-side surface;
a sixth lens comprising a refractive power; and
a seventh lens comprising negative refractive power and a convex object-side surface,
wherein the first to seventh lenses are sequentially disposed from an object side,
wherein a radius of curvature of an object-side surface of the second lens is greater than the radius of curvature of the object-side surface of the sixth lens, and
wherein a thickness along an optical axis of the fifth lens is greater than a thickness along an optical axis of the sixth lens.

2. The optical imaging system of claim 1, wherein the third lens has positive refractive power.

3. The optical imaging system of claim 1, wherein the fourth lens has a concave image-side surface.

4. The optical imaging system of claim 1, wherein the fifth lens has a concave object-side surface.

5. The optical imaging system of claim 1, wherein an f-number of the optical imaging system is 1.8 or less.

6. The optical imaging system of claim 1, wherein 0.8<TL/f<1.4, where TL is a distance from an object-side surface of the first lens to an imaging plane, and f is an overall focal length of the optical imaging system.

7. The optical imaging system of claim 1, wherein 1.2<TL/ImgH<2.0, where TL is a distance from an object-side surface of the first lens to an imaging plane, and ImgH is one-half of a diagonal length of the imaging plane.

8. The optical imaging system of claim 1, wherein 0.8<Td/f<1.2, where Td is sum of thickness of the first to seventh lenses, and f is an overall focal length of the optical imaging system.

9. The optical imaging system of claim 1, wherein 0.65<f1/f<1.5, where f1 is a focal length of the first lens, and f is an overall focal length of the optical imaging system.

10. The optical imaging system of claim 1, wherein 1.2<f3/f<8.0, where f3 is a focal length of the third lens, and f is an overall focal length of the optical imaging system.

11. The optical imaging system of claim 1, wherein −0.75<f1/f2<−0.3, where f1 is a focal length of the first lens, and f2 is a focal length of the second lens.

12. The optical imaging system of claim 1, wherein 0.35<r4/f<0.95, where r4 is a radius of curvature of an image-side surface of the second lens, and f is an overall focal length of the optical imaging system.

13. The optical imaging system of claim 1, wherein 0.75<f123/f<1.3, where f123 is a synthetic focal length of the first, second, and third lenses.

14. An optical imaging system comprising:
a first lens comprising positive refractive power and a concave image-side surface;
a second lens comprising negative refractive power and a convex object-side surface;
a third lens comprising a refractive power;
a fourth lens comprising a refractive power and a concave image-side surface;
a fifth lens comprising a refractive power;
a sixth lens comprising a concave image-side surface; and
a seventh lens comprising negative refractive power,
wherein the first to seventh lenses are sequentially disposed from an object side,
wherein a radius of curvature of an image-side surface of the sixth lens is greater than the radius of curvature of the object-side surface of the sixth lens,
wherein a thickness along an optical axis of the fifth lens is greater than a thickness along an optical axis of the sixth lens, and
wherein 0.65<f1/f<1.5, where f1 is a focal length of the first lens and f is an overall focal length of the optical imaging system.

15. The optical imaging system of claim 14, wherein the fourth lens has negative refractive power.

* * * * *

UNITED STATES PATENT AND TRADEMARK OFFICE
CERTIFICATE OF CORRECTION

| | | |
|---|---|---|
| PATENT NO. | : 12,025,778 B2 | Page 1 of 1 |
| APPLICATION NO. | : 17/723898 | |
| DATED | : July 2, 2024 | |
| INVENTOR(S) | : Ho Sik Yoo et al. | |

It is certified that error appears in the above-identified patent and that said Letters Patent is hereby corrected as shown below:

On the Title Page

Between items (63) and (51) insert the following item (30):
--(30) Foreign Application Priority Data
Aug. 18, 2017 (KR) ...................... 10-2017-0104577--

Signed and Sealed this
Twenty-fourth Day of September, 2024

Katherine Kelly Vidal
*Director of the United States Patent and Trademark Office*